United States Patent
Nakatani et al.

(10) Patent No.: US 6,823,664 B2
(45) Date of Patent: Nov. 30, 2004

(54) EXHAUST GAS PURIFICATION DEVICE

(75) Inventors: Koichiro Nakatani, Mishima (JP); Shinya Hirota, Susono (JP); Akira Mikami, Susomo (JP); Toshiaki Tanaka, Susono (JP); Takamitsu Asanuma, Susono (JP); Koichi Kimura, Susono (JP); Shunsuke Toshioka, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 10/307,311

(22) Filed: Dec. 2, 2002

(65) Prior Publication Data

US 2003/0106306 A1 Jun. 12, 2003

(30) Foreign Application Priority Data

Dec. 7, 2001 (JP) ........................................ 2001-374828

(51) Int. Cl.[7] .............................................. F01N 3/00
(52) U.S. Cl. ............................. 60/295; 60/285; 60/286; 60/288; 60/296; 60/324
(58) Field of Search ........................ 60/274, 276, 277, 60/284, 285, 286, 287, 288, 295, 297, 303, 324, 296

(56) References Cited

U.S. PATENT DOCUMENTS

| | | | | |
|---|---|---|---|---|
| 5,473,890 A | * | 12/1995 | Takeshima et al. | ............ 60/285 |
| 6,058,700 A | * | 5/2000 | Yamashita et al. | ............. 60/285 |
| 6,167,696 B1 | * | 1/2001 | Maaseidvaag et al. | ......... 60/274 |
| 6,293,094 B1 | * | 9/2001 | Schmidt et al. | ............... 60/284 |
| 6,314,722 B1 | | 11/2001 | Matros et al. | |
| 6,318,073 B1 | * | 11/2001 | Boegner et al. | ............... 60/274 |
| 6,341,722 B1 | | 1/2002 | Tolve et al. | |
| 6,378,297 B1 | * | 4/2002 | Ito et al. | ........................ 60/284 |
| 6,637,189 B1 | * | 10/2003 | Boegner et al. | ............... 60/274 |

FOREIGN PATENT DOCUMENTS

| FR | 2 796 984 | 2/2001 |
|---|---|---|
| JP | B2 2727906 | 12/1997 |

OTHER PUBLICATIONS

U.S. patent application Ser. No. 10/088,207, Matsuoka et al., filed Mar. 15, 2002.

* cited by examiner

*Primary Examiner*—Tu M. Nguyen
(74) *Attorney, Agent, or Firm*—Oliff & Berridge, PLC

(57) ABSTRACT

An exhaust gas purification device having a NOx absorbent includes a by-pass passage for by-passing the NOx absorbent, an exhaust gas flow rate control portion for regulating both a flow rate of exhaust gas flowing to the NOx absorbent and the flow rate of the exhaust gas bypassing the NOx absorbent, and a reductant addition portion for adding reductant into an exhaust passage upstream of the NOx absorbent. In this device, when it is necessary to discharge sulfur components from the NOx absorbent, a temperature rise control is executed such that a temperature of the NOx absorbent becomes higher than a predetermined temperature. Next, a rich condition control is executed such that an air-fuel ratio of the exhaust gas flowing to the NOx absorbent becomes one of a substantially stoichiometric condition and a rich condition. The flow rate of the exhaust gas to the NOx absorbent during the temperature rise control is controlled so as to be higher than that during the rich condition control.

17 Claims, 13 Drawing Sheets

(A)

(B)

EXHAUST GAS PURIFICATION DEVICE

INCORPORATION BY REFERENCE

The disclosure of Japanese Patent Application No. 2001-374828 filed on Dec. 7, 2001 including the specification, drawings and abstract is incorporated herein by reference in its entirety.

BACKGROUND OF THE INVENTION

1. Field of the Invention

The invention relates to a device for purification of exhaust gas of an internal combustion engine, and in particular, relates to an exhaust gas purification device having means for removal of nitrogen oxides (NOx) contained within the exhaust gas.

2. Description of the Related Art

Generally, direct injection internal combustion engines, for example, diesel engines, are required to remove exhaust particulate matter such as soot, as well as nitrogen oxides (NOx), contained within exhaust gas. In order to address this requirement, a method has been proposed in which a particulate filter supported by a NOx absorbent is disposed in an exhaust gas passage of an internal combustion engine.

The NOx absorbent used in such cases absorbs NOx when the air-fuel ratio is lean. In addition, the NOx absorbed in the NOx absorbent is reduced and purified, if the air-fuel ratio of the exhaust gas becomes rich and there is a reductant such as HC or CO present within the exhaust gas also (by a NOx absorption-discharge-reduction action or a NOx absorption-reduction action). By utilizing this action, NOx within the exhaust gas is absorbed into the NOx absorbent when the air-fuel ratio of the exhaust gas is lean. However, after use over a given period of time, when the absorption efficiency of the NOx absorbent falls or just prior to absorption efficiency falling, the reductant (fuel) is supplied, or the like, to the NOx absorbent, and reduction-purification of the absorbed NOx is executed. It should be noted that in this specification the term "absorption" also includes the meaning "adsorption". Accordingly, the term "NOx absorbent" which will be used hereinafter, includes both a "NOx absorption agent" that stores NOx in the form of nitrate, or the like, and a "NOx adsorption agent" that adsorbs NOx as $NO_2$, and the like.

However, there are cases when the fuel of the internal combustion engine contains sulfur (S) components, and as a result, sulfur oxides (SOx) are contained within the exhaust gas. When SOx is present within the exhaust gas, the NOx absorbent executes the absorption of SOx using exactly the same mechanism as is used to execute the absorption of NOx within the exhaust gas.

However, the SOx which is absorbed into the NOx absorbent is comparatively stable, and is, generally speaking, easily stored in the NOx absorbent. If the amount of SOx stored in the NOx absorbent increases, the NOx storage amount of the NOx absorbent decreases. As a result, the NOx absorbent becomes unable to adequately remove NOx within the exhaust gas and thus the problem of so-called sulfur poisoning (hereinafter referred to as "S poisoning), in other words, a fall in NOx purification efficiency occurs. In particular, the problem of S poisoning has a tendency to occur in diesel engines that use diesel oils which contain a comparatively large sulfur component within the fuel.

On the other hand, it is widely known that SOx stored within the NOx absorption agent can be discharged, desorped, and the like, by the same mechanism as for NOx. However, since SOx is stored in the NOx absorbent in a comparatively stable form, it is difficult for the stored SOx to be discharged at the temperature at which the NOx reduction-purification control is executed (for example, at around 250° C. or above). Accordingly, in order to solve the problem of S poisoning it is necessary to raise the temperature of the NOx absorbent to a temperature higher than the normal temperature for executing NOx reduction-purification control, on in other words, to a temperature at which sulfur is discharged (for example, 600° C. or above). Furthermore, it is also necessary to change the air-fuel ratio of the inflowing exhaust gas to a substantially stoichiometric condition or a rich condition (hereinafter these conditions are simply referred to as a "rich condition") and periodically execute S poisoning regeneration control.

It is presumed that a temperature condition at which S poisoning regeneration control can be executed is obtainable at times of high load/high engine rpm combustion engine becomes high. However, when the internal combustion engine is in such a high load/high rpm operational state, the amount of exhaust gas discharged from the internal combustion engine increases. As a result, in order to form an exhaust gas with a rich air-fuel ratio for execution of the S poisoning regeneration control, a large amount of fuel (reductant) appropriate to the amount of the exhaust gas is necessary. This, however, leads to a deterioration in fuel consumption. Moreover, in this case, the flow rate of the exhaust gas flowing through the NOx absorbent becomes higher, and thus the contact time of the exhaust gas and the NOx absorbent becomes shorter. As a result, sufficient reaction time for the reductant contained in the fuel can no longer be obtained, and problems related to worsening emissions occur (for example, the amount of hydrocarbons that elude the absorption agent increases).

In order to suppress such deterioration in fuel consumption and worsening emissions, a method for executing the S poisoning regeneration control has been disclosed. In this method, in contrast to above, the temperature of the NOx absorbent is raised by adding fuel to the exhaust gas at times such as idling stop and deceleration when the exhaust gas amount discharged from the internal combustion engine becomes less. However, in this case, the amount of exhaust gas discharged from the internal combustion engine is small and thus the heating value of the combustion of the added fuel is limited. Accordingly, this method suffers from the problem that it takes time for the temperature of the NOx absorbent to rise.

In addition, a heating method using heating means such as an electric heater or a burner, is known as a method for raising the temperature of the NOx absorbent. However, in this case, problems arise such as an increase in device cost due to providing the heating means, and an increase in fuel consumption resulting from the energy required for heating.

SUMMARY OF THE INVENTION

In the light of the foregoing circumstances, it is an object of the invention to provide an exhaust gas purification device which can, with respect to S poisoning regeneration of a NOx absorbent, reduce regeneration time and suppress the worsening of emissions and deterioration in fuel consumption.

In order to accomplish the above object, an exhaust gas purification device according to a first aspect of the invention is provided with a NOx absorbent, an exhaust gas flow rate control portion, a reductant addition portion, a temperature rise control portion, a rich condition control portion, and an S poisoning regeneration control portion. The NOx absorbent is disposed in an exhaust gas passage through which exhaust gas discharged from an internal combustion engine passes, and absorbs NOx when the air-fuel ratio of the exhaust gas flowing into the exhaust gas purification device is lean, and reduces and purifies the absorbed NOx when the air-fuel ratio of the inflowing exhaust gas becomes richer. The exhaust gas flow rate control portion controls a flow rate of the exhaust gas flowing to the NOx absorbent. The reductant addition portion adds reductant into the exhaust gas passage upstream of the NOx absorbent. The temperature rise control portion controls a temperature of the NOx absorbent such that the temperature is higher than a predetermined temperature; a rich condition control portion for controlling the air-fuel ratio of the exhaust gas flowing to the NOx absorbent such that a substantially stoichiometric condition or a rich condition is formed. The S poisoning regeneration control portion for discharging sulfur components from the NOx absorbing portion executes control of the temperature rise control portion and the rich condition control portion in succession, and furthermore, executes a control of the exhaust gas flow rate control portion such that the flow rate of the exhaust gas flowing to the NOx absorbent is less during execution of control of the rich condition control portion than during execution of control of the temperature rise control portion.

Furthermore, according to the first aspect, the exhaust gas purification device may further include a by-pass passage that by-passes the NOx absorbent. Moreover, the exhaust gas flow rate control portion may be configured such that it can control both the flow rate of the exhaust gas flowing to the NOx absorbent, and the flow rate of the exhaust gas which by-passes the NOx absorbent.

BRIEF DESCRIPTION OF THE DRAWINGS

The foregoing and further objects, features and advantages of the invention will occur from the following description of preferred embodiments with reference to the accompanying drawings, wherein like numerals are used to represent like elements and wherein.

DESCRIPTION OF THE PREFERRED EMBODIMENTS

Hereinafter, embodiments of the invention will be described with reference to the drawings. It should be noted that the invention can be realized using one of a NOx absorbent and a NOx adsorbing agent. However, hereinafter an explanation will be given for the case of the NOx absorbent.

Figure 1:
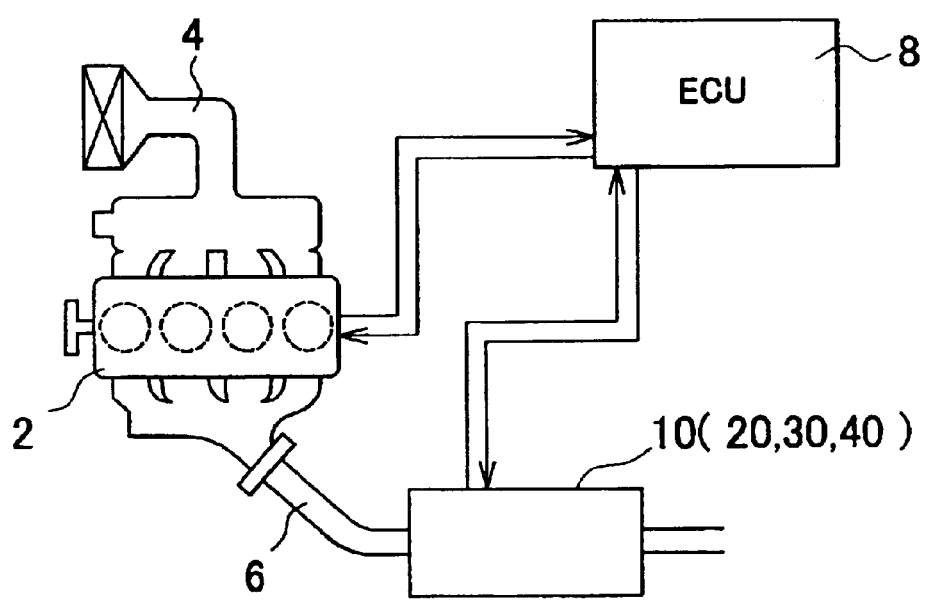
FIG. 1 shows an exhaust gas purification device according to the invention which has been applied to a diesel engine.

FIG. 1 shows an exhaust gas purification device according to the invention which has been applied to a diesel engine. FIG. 1 shows an engine body 2, an intake passage 4, and an exhaust gas passage 6. An exhaust gas purification device 10 according to the invention is provided in the exhaust gas passage 6. The exhaust gas purification device 10 disposed in the exhaust gas passage 6 will be described in detail hereinafter, using the example exhaust gas purification devices 20, 30 and 40 according to the embodiments.

An electronic control unit (hereinafter referred to as "ECU") 8 is composed from a known type of digital computer connected by a bi-directional bus to a CPU (a central processing unit), a RAM (a random access memory) a ROM (a read only memory) and an input-output port. This ECU 8 executes basic controls of the engine such as controlling a fuel injection amount by exchanging signals with the engine body 2. As well as this, the ECU 8 executes, as will be described hereinafter for each embodiment according to the invention, the exchange of signals between the ECU 8 and each component element of an exhaust gas purification device. The ECU 8 also executes controls such as S poisoning regeneration control of a NOx absorbent of the exhaust gas purification device.

Figure 2:
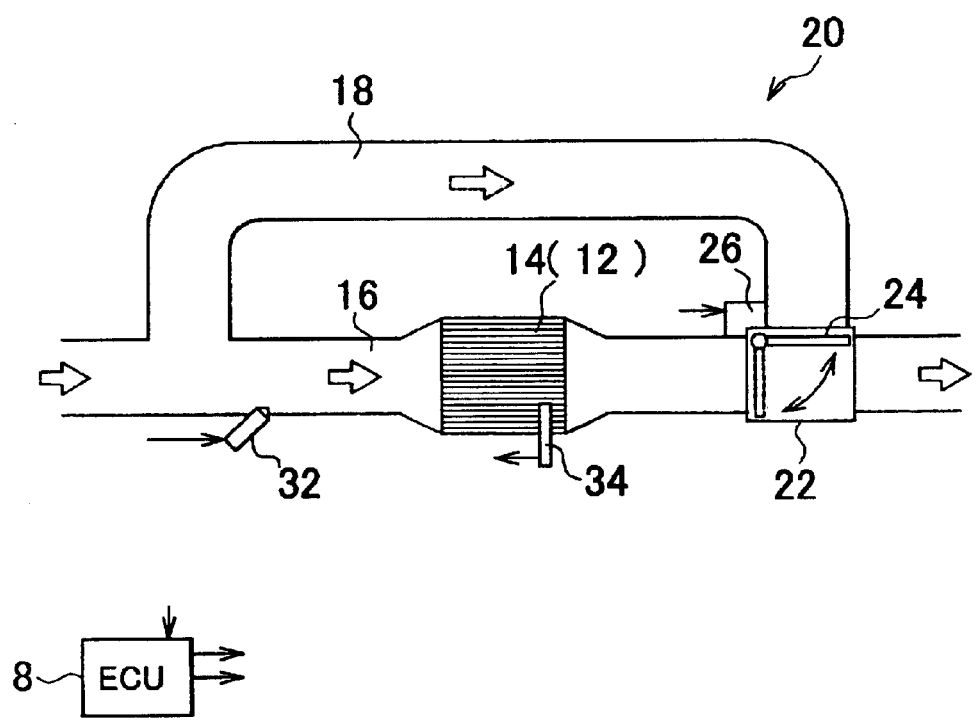
FIG. 2 is an explanatory diagram showing the exhaust gas purification device according to a first embodiment of the invention.

FIG. 2 is an explanatory diagram which schematically shows a configuration of the exhaust gas purification device 20 according to a first embodiment of the invention. This exhaust gas purification device 20 is installed in a portion of the exhaust gas purification device 10 shown in FIG. 1 and forms a section of the exhaust gas passage 6. The flow of exhaust gas within the exhaust gas purification device 20 is shown.

As shown in FIG. 2, the exhaust gas purification device 20 includes a main passage 16 having a particulate filter (hereafter filter) 14 which is means for removing exhaust particulate matter within the exhaust gas, and a by-pass passage 18 which diverges from the main passage 16 on an upstream side of the filter 14 and converges with the main passage 16 on a downstream side of the filter 14. As previously described, a NOx absorbent 12 is supported on the filter 14.

A regulation portion 22 is provided at a converge portion of the main passage 16 and the by-pass passage 18 on the downstream side of the filter 14. This regulation portion 22 regulates the flow rates of the exhaust gas flowing in the main passage 16 and the by-pass passage 18, respectively. The regulation portion 22 is provided with a regulation valve 24 and a driving portion 26 which drives the regulation valve 24. The regulation valve 24 is driven between a first position (shown by the solid line in FIG. 2) at which no exhaust gas flows in the by-pass passage 18, and a second position (shown by the dashed line in FIG. 2) at which no exhaust gas flows in the main passage 16. The regulation portion 22 regulates the flow rates of the exhaust gas flowing in the main passage 16 and the by-pass passage 18, respectively. Normally, however, the regulation valve 24 is located in the first position such that all of the exhaust gas flows along the main passage 16 and passes through the filter 14.

In addition, a reductant addition portion is provided upstream of the filter 14 of the main passage 16. This reductant addition portion is for addition of reductant into the main passage 16 when the S poisoning regeneration control, and the like, of the NOx absorbent 12 is executed, as will be described later. The reductant addition portion includes a reductant injection nozzle 32 and a reductant supply pump (not shown). The ECU 8 controls the addition of the reductant, supplied from the reductant supply pump, into the main passage 16 using the reductant injection nozzle 32. The reductant is added in an appropriate manner in accordance with control stages, and the like, of which a more detailed description will be given later. It should be noted that, in this embodiment, a diesel oil that is the fuel for the engine body 2 is used as the reductant, in order to avoid complications which occur when storing and replenishing the reductant, and the like.

The regulation portion 22 and the reductant addition portion are controlled by the ECU 8. More particularly, the ECU 8 is connected to the driving portion 26 of the regulation portion 22, and controls a regulation operation of the regulation valve 24 by controlling the driving portion 26. In addition, the ECU 8 is connected to the reductant injection nozzle 32 of the reductant addition portion, and controls a reductant addition operation of the reductant injection nozzle 32 by controlling the reductant injection nozzle 32.

Furthermore, in this embodiment, in the filter 14 which supports the NOx absorbent 12, a temperature sensor 34 is provided. This temperature sensor 34 is temperature estimation means for measuring a temperature of the NOx absorbent 12. The temperature sensor 34 is connected to the ECU 8. When a measurement result of the temperature sensor 34 is received by the ECU 8, the ECU 8 determines an amount of reductant to be added for the S poisoning regeneration control of the NOx absorbent, based upon the received measurement result. The ECU 8 also controls the reductant addition operation of the reductant injection nozzle 32. In addition, in this embodiment in particular, the temperature sensor 34 is provide such that it measures the temperature at the downstream side end portion of the NOx absorbent 12. This is because the temperature of the NOx absorbent 12 generally reaches its highest value at this downstream side end (an explanation will be given hereinafter with reference to FIG. 13 related to a third embodiment). As a result, if the temperature of the NOx absorbent 12 at this point is monitored, it is possible to prevent deterioration of the NOx absorbent 12 caused by a temperature rise more than necessary of the entire NOx absorbent 12.

Furthermore, in this embodiment, the temperature sensor 34 is provided in direct connection with the filter 14 supporting the NOx absorbent 12. However, the temperature sensor 34 may be provided at the downstream side of the filter 14 supporting the NOx absorbent 12, such that it obtains the temperature of the NOx absorbent 12 by means such as estimating, and the like, the temperature (in particular the temperature at the downstream side edge) of the NOx absorbent 12, by estimating the temperature of the exhaust gas.

Figure 3:
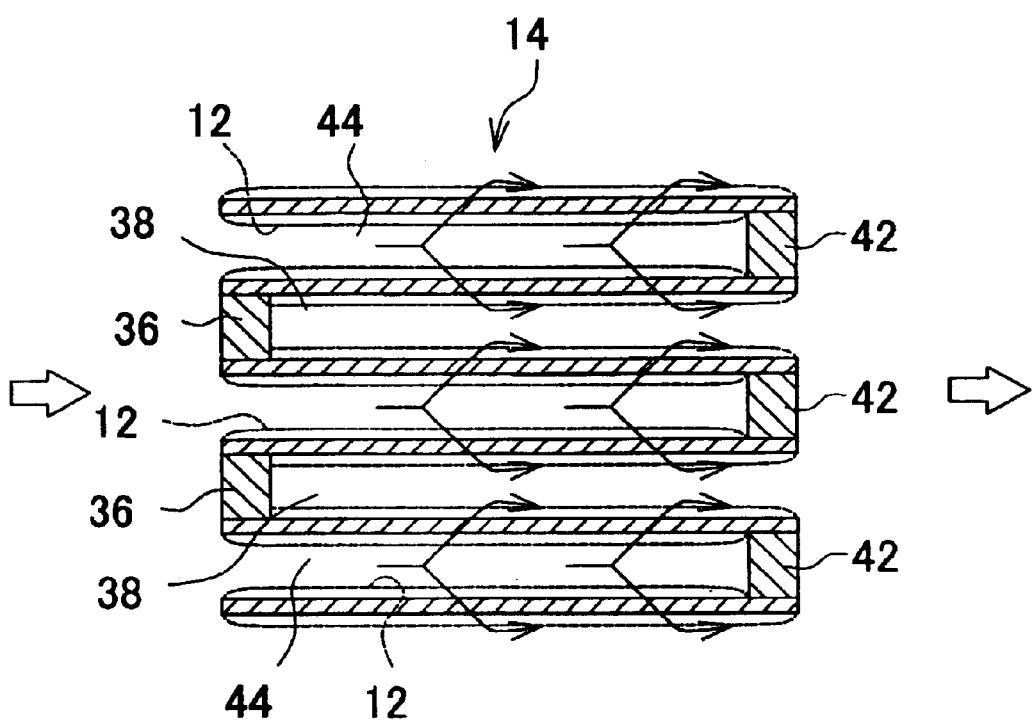
FIG. 3 is an enlarged cross sectional view of a NOx absorbent supported by a particulate filter.

FIG. 3 shows an expanded cross sectional view of the filter 14. As can be seen from FIG. 3, the filter 14 is formed from a porous ceramic. The exhaust gas flows from the left to the right side of the figure, as indicated by the arrows. The filter 14 has a honeycomb structure having first passages 38 provided with plugs 36 at the upstream side. The first passages 38 are mutually interleaved with second passages 44 provided with plugs 42 at the downstream side. As the exhaust gas flows from the left to the right side of the figure, it flows from the second passages 44 into the first passages 38 by passing through the porous ceramic of the partition walls, and then flows to the downstream side. At this time, exhaust particulate matter (particulate) within the exhaust gas is retained by the porous ceramic, thus removing the particulate matter from the exhaust gas and inhibiting its discharge into the atmosphere.

The NOx absorbent 12 is supported on the pores within the partition walls of the first passages 38 and the second passages 44. The NOx absorbent 12 is composed from at least one of an alkali metal, for example, kalium K, sodium Na, lithium Li or cesium CS, an alkali earth such as barium Ba or calcium Ca, or a rare earth such as lanthanum La or yttrium Y, and a precious metal such as platinum Pt. The NOx absorbent 12 absorbs NOx when the air-fuel ratio of the inflowing exhaust gas is lean. Hereinafter, the exhaust which flows to the NOx absorbent will be referred to as the "NOx absorbent inflow exhaust gas". The NOx absorbent 12 also discharges absorbed NOx when the air-fuel ratio of the NOx absorbent inflow exhaust gas becomes richer, and conducts reduction-purification of this NOx (using a NOx absorption-discharge action and a NOx reduction-purification action).

As this embodiment uses a diesel engine, the air-fuel ratio of the exhaust gas at normal times is lean, and thus the NOx absorbent 12 executes absorption of the NOx within the exhaust gas. In addition, if the air-fuel ratio of the NOx absorbent inflow exhaust gas is made richer due to reductant being supplied from the reductant addition portion to the exhaust gas passage on the upstream side of the filter 14, the NOx absorbent 12 discharges the absorbed NOx and executes reduction-purification of the discharged NOx.

Figure 4:
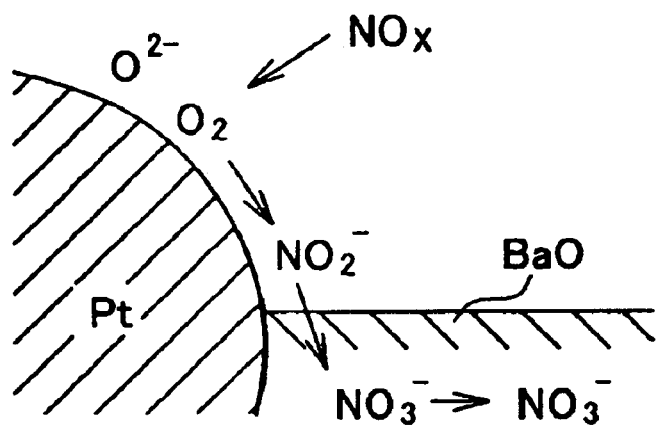
FIGS. 4A and 4B are explanatory diagrams of a NOx absorption-discharge action and a NOx reduction-purification action.
Figure 4:
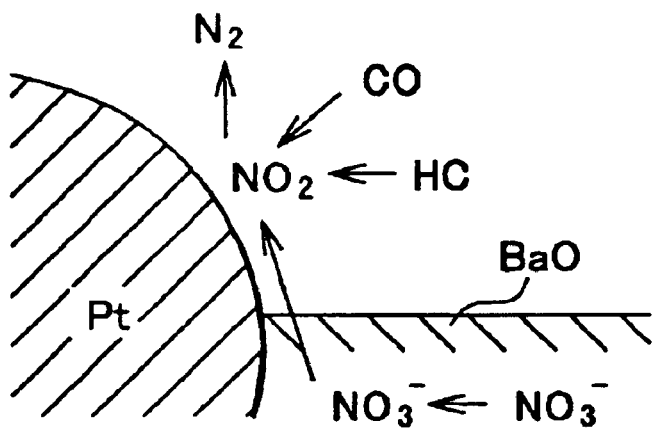

With regard to the precise details of the mechanism involved in the absorption-discharge action and the reduction-purification action, there are some parts of the mechanisms that are not fully clear. However, it is presumed that the absorption-discharge action and the reduction-purification action are performed utilizing the mechanism shown in FIG. 4. Hereinafter, an explanation of this mechanism when supported by platinum Pt and barium Ba will be presented, but this is merely an example. The same mechanism could be realized using another precious metal and another alkali metal, alkali-earth or rare earth.

When the air-fuel ratio of the NOx absorbent inflow exhaust gas becomes relatively lean, the oxygen concentration within the NOx absorbent inflow exhaust gas increases significantly. Thus, oxygen $O_2$ adheres to the surface of the platinum Pt in the form of $O_2^-$ or $O^{2-}$, as shown in FIG. 4A. On the other hand, the NO within the NOx absorbent inflow exhaust gas reacts with the $O_2^-$ or $O^{2-}$ on the surface of the platinum Pt, and becomes $NO_2(2NO+O_2 \rightarrow 2NO_2)$. Following this, a portion of the formed $NO_2$ continues to be further oxidized on the surface of the platinum Pt. The $NO_2$ is absorbed within the NOx absorbent 12, and while bonding with the barium oxide BaO is defused within the NOx absorbent 12 in the form of nitrate ions $NO_3^-$, as shown in FIG. 4A. In this manner, NOx is absorbed within the NOx absorbent.

As long as the oxygen concentration within the NOx absorbent inflow exhaust gas is high, $NO_2$ is formed on the surface of the platinum Pt. Furthermore, so long as the NOx absorption capacity of the NOx absorbent 12 is not saturated, $NO_2$ is absorbed within the NOx absorbent 12 and nitrate ions $NO_3^-$ are formed. In contrast to this, when the oxygen concentration within the NOx absorbent inflow exhaust gas falls, there is a reduction in the amount of $NO_2$ formed. Accordingly, the reaction proceeds in the reverse direction ($NO_3^- \rightarrow NO_2$). In this way, the $NO_3^-$ within the NOx absorbent 12, is discharged from the NOx absorbent 12 in the form of $NO_2$ In other words, when the oxygen concentration within the NOx absorbent inflow exhaust gas falls, NOx is discharged from the NOx absorbent 12. Furthermore, if the air-fuel ratio of the NOx absorbent inflow exhaust gas becomes leaner, the oxygen concentration within the NOx absorbent inflow exhaust gas falls. Accordingly, if the NOx absorbent inflow exhaust gas is made leaner, NOx is discharged from the NOx absorbent 12.

On the other hand, if the air-fuel ratio of the NOx absorbent inflow exhaust gas at this time is made richer, HC and CO react with the oxygen $O_2^-$ or $O^{2-}$ on the surface of the platinum Pt and are oxidized. In addition, if the air-fuel ratio of the NOx absorbent inflow exhaust gas is made richer, the oxygen concentration within the NOx absorbent inflow exhaust gas falls, and thus $NO_2$ is discharged from the NOx absorbent 12. This $NO_2$ reacts with unburned HC and CO, and is thus reduced and purified, as shown in FIG. 4B. If the $NO_2$ present on the surface of the platinum Pt completely disappears in this manner, the $NO_2$ within the NOx absorbent 12 is successively discharged. Accordingly, if the air-fuel ratio of the NOx absorbent inflow exhaust gas is made richer, the NOx is discharged from the NOx absorbent 12 and reduced and purified in a short period of time.

The air-fuel ratio of exhaust gas which has been mentioned, indicates the ratio of the air and the fuel supplied to the exhaust gas passage 6 on the upstream side of the NOx absorbent 12 and the engine combustion chamber, or the intake passage. Accordingly, when the air or the reductant are not supplied to the exhaust gas passage 6, the air-fuel ratio becomes equal to the operating air-fuel ratio of the engine (the combustion air-fuel ratio of the engine combustion chamber). In addition, a substance which generates reduction components for reducing hydrocarbons and carbon monoxide may be used as the reductant according to the invention. For example, gases such as hydrogen and carbon monoxide, gases or liquids such as propane, propylene and butane, or liquid fuels such as liquid hydrocarbons, gasoline, diesel oil and kerosene, may be used. However, as described previously, in this embodiment diesel oil, which is the fuel of the engine body 2, is adopted as the reductant in order to avoid complications related to storage and replenishment.

Next, the S poisoning regeneration mechanism of the NOx absorbent 12 will be explained. If SOx components are contained within the exhaust gas, the NOx absorbent 12 absorbs the SOx by the same mechanism, described previously, as is used for the absorption of NOx. In other words, when the air-fuel ratio of the exhaust gas is lean, the SOx with the exhaust gas (for example, $SO_2$) is oxidized on the surface of the platinum Pt, becomes $SO_3^-$, $SO_4^-$, bonds with the barium oxide BaO and forms $BaSO_4$. $BaSO_4$ is comparatively stable, and, in addition, is difficult to decompose and discharge once it has been formed, due to having crystals which are easily made bulkier. As a result, if the generated amount of $BaSO_4$ in the NOx absorbent 12 increases, the amount of BaO which can be utilized for the absorption of NOx decreases, and NOx absorption capacity reduces. This phenomenon is known as S poisoning.

In order to solve this S poisoning problem, it is necessary to; decompose the $BaSO_4$ generated in the NOx absorbent 12 at high temperature; change the $SO_3^-$ and $SO_4^-$ nitrate ions generated by this decomposition to gaseous $SO_2$ by reducing them under one of a substantially stoichiometric condition and a rich condition, which includes a slightly lean condition, (hereinafter all of these conditions will simply be referred to as "rich condition"); and discharge this $SO_2$ gas from the NOx absorbent 12. Accordingly, in order to solve the S poisoning problem, it is necessary to place the NOx absorbent 12 into a state where the temperature is high and a rich condition exists.

Figure 5:
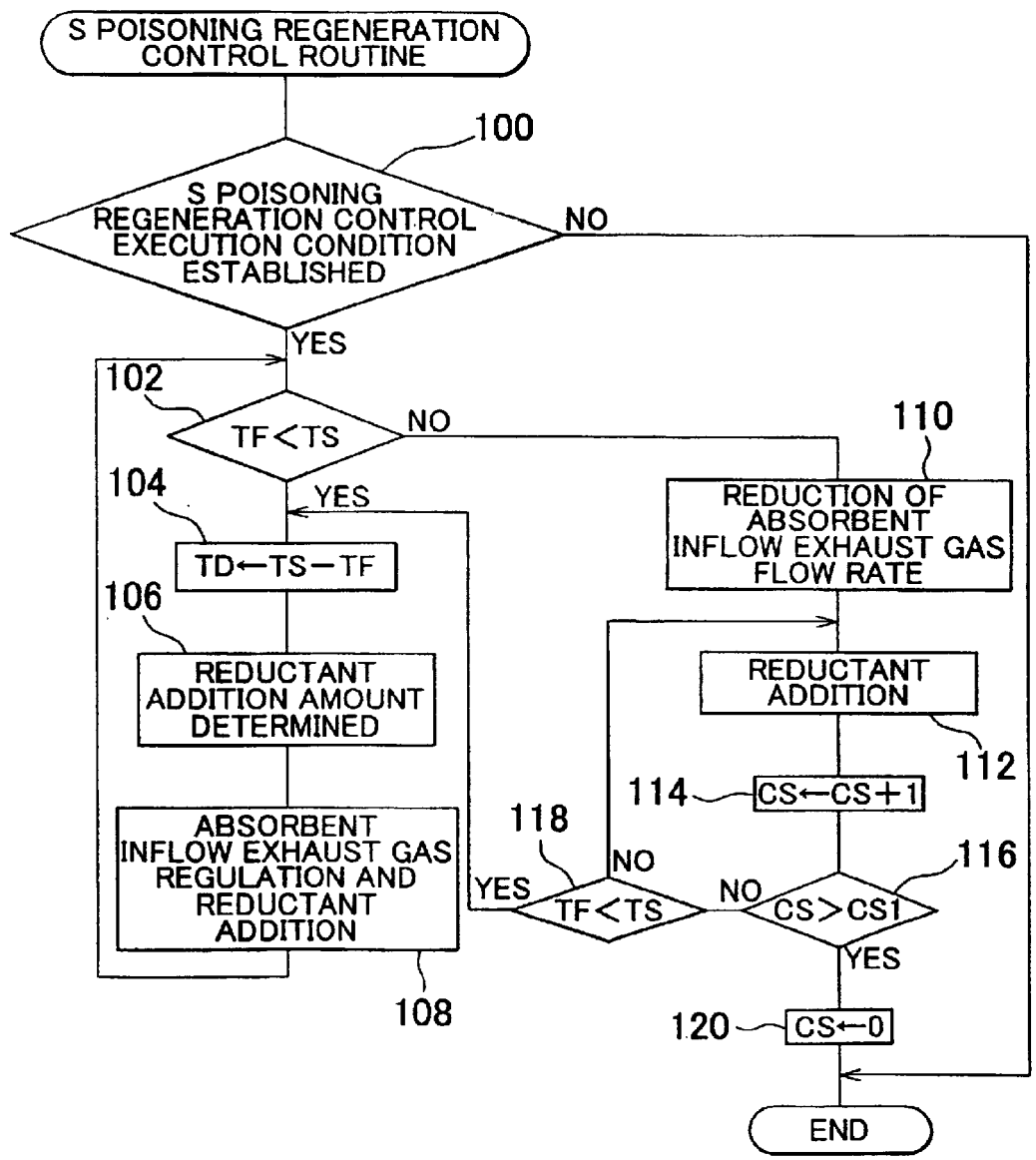
FIG. 5 is a flow chart showing a control routine for S poisoning regeneration control of the NOx absorbent according to the first embodiment.

Next, the operation of the embodiment will be explained with reference to FIG. 5. FIG. 5 is a flow chart showing a control routine for the S poisoning regeneration control of the NOx absorbent according to this embodiment. This control routine is the same as that used for the third embodiment that will be described later, and also has sections which are the same as the control routine used by a second embodiment. As a result, the explanation of the control routine for the S poisoning regeneration control which will be given hereinafter, also applies to the other embodiments. Furthermore, the S poisoning regeneration control according to the invention includes, as will be described, temperature rise control and rich condition control. This control routine is executed by the ECU 8 using an interrupt at constant intervals.

Furthermore, within the explanation of this embodiment, a detailed explanation of only the S poisoning regeneration control will be presented. However, discharge of NOx from the NOx absorbent 12 may be executed according to a known method for NOx discharge control, either prior to or after the S poisoning regeneration control. This holds true for all of the embodiments according to the invention, that will be described later. The NOx discharge control is executed, for example, when the temperature of the NOx absorbent 12 is equal to or above a NOx discharge temperature, by driving the regulation valve 24 toward the second position. This reduces the NOx absorbent inflow exhaust gas flow rate. Furthermore, control is executed such that reduction agent is added into the main passage 16 by the reductant injection nozzle 32 of the reductant addition portion. As a result, the air-fuel ratio of the exhaust gas becomes richer.

As shown by FIG. 5, first, in step S100, it is determined whether an execution condition for the S poisoning regeneration control of the NOx absorbent 12 has been established. The S poisoning regeneration control execution condition is, for example, that the amount of SOx absorbed in the NOx absorbent 12, namely, the absorbed SOx amount, has become equal to or more than a predetermined amount. However, in this case, it is difficult to directly derive the absorbed SOx amount. Thus, the absorbed SOx amount is estimated based on the amount of SOx discharged from the engine, or in other words, from the running distance of the vehicle. Namely, when the running distance since the time when the S poisoning regeneration control was last executed exceeds a predetermined set value, it is determined that the execution condition for S poisoning regeneration control has been established.

If it is determined in step S100 that the execution condition for S poisoning regeneration control has not been established, the control routine ends. However, if it is determined that the execution condition has been established, the control routine proceeds to step S102. In step S102, the temperature TF of the NOx absorbent 12 (the filter 14) is measured, and compared with a sulfur content discharge temperature TS which is predetermined. In this embodiment, the temperature sensor 34 provided in the filter 14 supporting the NOx absorbent 12 measures the temperature TF. However, as previously described, the temperature TF of the NOx absorbent 12 may be calculated by means such as estimating, and the like, the temperature of the NOx absorbent 12, by measuring the temperature of the exhaust gas using the temperature sensor 34 provided at the downstream side of the filter 14 supporting the NOx absorbent 12. More particularly, a temperature TF of the NOx absorbent 12 prior to a start of temperature rise, may be calculated, for example, based on an operating condition of the engine. In order to achieve this, first, a map is prepared in advance which shows the temperature TF of the NOx absorbent 12 as a function of an engine load Q/N (an intake air amount Q/an engine speed N) and an engine speed N. It is then possible to calculate the temperature TF from the engine load Q/N and the engine speed N, based on the map. In this case, the map is stored in advance in the ROM of the ECU 8.

If it is determined as a result of the comparison of step S102 that the temperature TF is equal to or above the sulfur component discharge temperature TS, the control routine proceeds to step S110, and the rich condition control is initiated. On the other hand, if it is determined that the temperature TF is less than the sulfur component discharge temperature TS, then the control routine proceeds to step S104, and the temperature rise control is initiated.

In step S104 the difference between the sulfur component discharge temperature TS and the temperature TF, or in other words, a necessary temperature rise TD is derived. Next, in step S106, a reductant addition amount which is in accordance with the necessary temperature rise TD is determined. The determination of the reductant addition amount is executed in accordance with data. This data, which is stored on the ROM of the ECU 8, is calculated in advance through experimentation and shows the relationship of the extent of temperature rise with respect to reductant addition amount, for various operating conditions related to the exhaust gas purification device 20 according to the embodiment. Generally, as the necessary temperature rise TD increases, the amount of reductant which needs to be added also increases.

It should be noted that, in the aforementioned determination of the reductant addition amount, it is not necessary to determine the reductant addition amount such that the temperature rise for reaching the sulfur component discharge temperature TS is achieved by a single addition. For example, when there is considerable difference between the temperature TF and the sulfur component discharge temperature TS, namely, in cases such as when there is a temperature difference which is greater than a predetermined maximum temperature difference, a predetermined maximum addition amount may be added. In this case, as will described hereinafter, the temperature TF is measured once again following the addition of this maximum amount of reductant. Next, the reductant amount which is in accordance with the smaller temperature difference between the new temperature TF and the sulfur component discharge temperature TS is determined, and this amount of reductant is added. By executing determination in this manner, it is possible to conduct more precise temperature control, and suppress deterioration of the NOx absorbent caused by unexpected increases in the temperature TF of the NOx absorbent.

Following the determination of the reductant addition amount, the control routine proceeds to step S108. In step S108, the NOx absorbent inflow exhaust gas flow rate is regulated and the amount of the reductant determined in step S106 is added. The aforementioned regulation of the NOx absorbent inflow exhaust gas flow rate is executed such that, the regulation valve 24 is regulated by the driving portion 26 so as to supply sufficient oxygen for combustion of the reductant added for raising the temperature of the NOx absorbent 12. As a result of this, the added reductant is rapidly combusted, and it is possible to quickly raise the temperature of the NOx absorbent 12.

The NOx absorbent inflow exhaust gas flow rate at this time is a rate which supplies sufficient oxygen for combustion of the added reductant. Accordingly, the NOx absorbent inflow exhaust gas flow rate is generally larger than the NOx absorbent inflow exhaust gas flow rate when executing the aforementioned rich condition control. During this rich condition control the air-fuel ratio of the NOx absorbent inflow exhaust gas is changed to a substantially stoichiometric condition or a rich condition, using a small reductant addition amount. For example, the regulation valve 24 may be located in the first position such that all of the discharged exhaust gas from the engine body 2 flows to the NOx absorbent 12 (the filter 14). Alternatively, there are other cases, for example, the case of high load operation, where if the flow rate of the exhaust gas discharged from the engine body 2 is great and all of this exhaust gas is fed to the NOx absorbent 12, the heat quantity removed from the NOx absorbent 12 is substantial, due to the flow velocity of the exhaust gas passing through the NOx absorbent 12 being high. This is unfavorable from the point of view of rapidly executing the temperature rise of the NOx absorbent 12. In this type of case, the position of the regulation valve 24 is regulated such that only a portion of the exhaust gas discharged from the engine body 2 is fed to the NOx absorbent 12.

Moreover, the addition of reductant (namely, the addition of reductant which occurs during temperature rise control) using the reductant injection nozzle 32 of the reductant addition portion in step S108, is executed so as to maintain a lean condition of the average air-fuel ratio of the NOx absorbent inflow exhaust gas. As a result, sufficient oxygen for combustion of the added reductant is present. Thus it is possible to quickly increase the temperature of the NOx absorbent 12 due to the rapid combustion of the added reductant. Furthermore, the amount of reductant added at this time is in accordance with the necessary temperature rise TD. Accordingly, the temperature TF of the NOx absorbent 12 does not rise more than necessary, which prevents the temperature of the NOx absorbent 12 from reaching a temperature at which deterioration of the NOx absorbent 12 occurs.

The following methods, and the like, are proposed for maintaining the aforementioned lean condition of the average air-fuel ratio of the NOx absorbent inflow exhaust gas. For example, reductant addition may be executed by repeating an injection of reductant a plurality of times. The reduction agent addition may be executed such that, as compared to the reductant addition that occurs in the aforementioned rich condition control; the injection continuation duration is shorter and the injection frequency is higher; the injection amount per unit of time is smaller while the injection frequency is higher; or, the injection amount per unit of time is smaller while the injection continuation duration is longer. More specifically, the injection continuation duration, the injection frequency and the injection amount per unit of time vary depending on the NOx absorbent inflow exhaust gas flow rate. However, for example, there are times when reductant addition is executed at about 10 ms per every 2 sec for the temperature rise control, and on the other hand, at about 200 ms per every 30 sec for the rich condition control.

In addition, the regulation of the NOx absorbent inflow exhaust gas flow rate in step S108 may be executed according to the reductant addition amount per each unit of time. Namely, when the NOx absorbent inflow exhaust gas flow rate is relatively high, it is possible to easily maintain the lean condition of the average air-fuel ratio of the NOx absorbent inflow exhaust gas with respect to the addition of reductant. However, as previously described, since the flow velocity of the exhaust gas passing through the NOx absorbent 12 is high, the heat quantity removed from the NOx absorbent 12 is substantial. As a result, a state which is unfavorable from the point of view of executing rapid temperature rise of the NOx absorbent 12 is generated. In addition, in some cases, when the NOx absorbent inflow exhaust gas flow rate is relatively high, some of the added reductant adheres to the NOx absorbent 12, with being reacted with, and thus so-called HC (hydrocarbon) poisoning occurs.

These kinds of problems can be prevented by calculating, using prior experiments, or the like, an optimal NOx absorbent inflow exhaust gas flow rate in accordance with the reductant addition amount per each unit of time, and by executing a control. While making such calculations, the speed of the temperature rise and preventing HC poisoning is taken into consideration. The control is then executed such that the actual NOx absorbent inflow exhaust gas flow rate according to the reductant addition amount per each unit of time during actual reductant addition, becomes equal to the optimal NOx absorbent inflow exhaust gas flow rate. By executing this control, S poisoning is prevented. In this case, the optimal NOx absorbent inflow exhaust gas flow rate according with the reductant addition amount per unit of time, is stored on the ROM of the ECU 8 in advance. In addition, it is necessary to regulate the position of the regulation valve 24 such that the NOx absorbent inflow exhaust gas flow rate becomes equal to the predetermined optimal NOx absorbent inflow exhaust gas flow rate. This can be executed in the following manner.

The total amount of exhaust gas from the engine becomes larger as the engine load Q/N becomes larger and as the engine speed N become larger. If the total exhaust gas flow rate is calculated in advance as a function of the engine load Q/N and the engine speed N, it is possible to calculate the total exhaust gas flow rate for a predetermined engine operation state based on this function. Furthermore, in the case of each exhaust gas amount, it is possible to derive through experiments or calculation the flow rate of the exhaust gas flowing in the main passage 16 for each position of the regulation valve 24. In other words, it is possible to derive the NOx absorbent inflow exhaust gas flow rate.

Accordingly, both the total exhaust gas flow rate as a function of each engine load Q/N and engine speed N, and the NOx absorbent inflow exhaust gas flow rate as a function of total exhaust gas flow rate and regulation valve position are calculated. Both of these functions are stored on the ROM of the ECU 8. As a result, it is possible to determine the position of the regulation valve 24 so as to attain a desired NOx absorbent inflow exhaust gas flow rate in accordance with each operating condition. Furthermore, it is possible to regulate the position of the regulation valve 24 such that it is driven to the appropriate position, by controlling the driving portion 26. Alternatively, according to other embodiments, a flow velocity sensor may be assembled to the inflow edge of the NOx absorbent 12 (the filter 14). This sensor is used to measure and monitor the flow velocity. The flow rate is then estimated based on this measured value, and the position of the regulation valve 24 is regulated using feedback control such that a desired NOx absorbent inflow exhaust gas flow rate is attained.

If both regulation of the NOx absorbent inflow exhaust gas flow rate and addition of the reduction agent are executed in step S108, the control routine returns to step S102, and the temperature of the NOx absorbent 12 is measured once again and compared with the sulfur component discharge temperature TS. If, at this point, it is determined that the temperature TF is still less than the sulfur component discharge temperature TS, the control routine proceeds to step S104 and the aforementioned temperature rise control is repeated. On the other hand, if it is determined that the temperature TF is equal to or above the sulfur discharge temperature TS, the control routine proceeds to step S110, and rich condition control is initiated.

When rich condition control is initiated, first, in step S110, the reduction of the NOx absorbent inflow exhaust gas flow rate is executed. Accordingly, there is a reduction in the amount of reductant which needs to be added in order to change the air-fuel ratio of the NOx absorbent inflow exhaust gas to a substantially stoichiometric or rich condition. As a result, deterioration in fuel consumption and worsening of emissions is suppressed. This reduction of the NOx absorbent inflow exhaust gas flow rate is executed by driving the regulation valve 24 using the driving portion 26 to the second position side, which results in the NOx absorbent inflow exhaust gas flow rate becoming, at least, less than the NOx absorbent inflow exhaust gas flow rate at the time of the aforementioned temperature rise control.

Next, the addition of reductant is executed in step S112. The reductant addition that occurs in step S112 (namely the addition of reductant during rich condition control), is executed by the reductant injection nozzle 32 of the reductant addition portion such that the air-fuel ratio of the NOx absorbent inflow exhaust gas becomes richer. In other words, when the addition of reductant is executed, at least, the air-fuel ratio of the NOx absorbent inflow exhaust gas is changed to the substantially stoichiometric condition or the rich condition. Furthermore, the temperature TF is kept below a predetermined temperature at which the NOx absorbent 12 deteriorates. When the air-fuel ratio of the NOx absorbent inflow exhaust gas becomes richer as a result, SOx (sulfur components) are discharged from the NOx absorbent 12.

For the aforementioned reductant addition method, the following methods are proposed. For example, the reductant addition may be executed by repeating an injection of reductant a plurality of times. The reductant addition may be executed such that, as compared to the reductant addition that occurs in the aforementioned temperature rise control; the injection continuation duration is longer and the injection frequency is lower; the injection amount per unit of time is larger while the injection frequency is lower; or, the injection amount per unit of time is larger while the injection continuation duration is shorter. As a result, a comparatively large amount of reductant is added in a short time period, and the air-fuel ratio of the NOx absorbent inflow exhaust gas becomes richer. In addition, the reason for intermittently injecting reductant is to keep the temperature TF from reaching the predetermined temperature at which the NOx absorbent 12 deteriorates. Furthermore, the reductant addition method may be regulated by monitoring the temperature TF during the reductant addition in advance, such that the temperature TF does not reach the predetermined temperature at which the NOx absorbent 12 deteriorates.

Following the beginning of reductant addition, in the next step S114, a value of a counter CS showing the rich condition control execution time, namely, the time period for which the sulfur component discharge action has been executed, increases by an increment of one. Next, it is determined in step S116 whether the value of the counter CS is larger than a constant value CS1, in other words, whether the sulfur component discharge action has been executed for a predetermined time period sufficient to discharge the absorbed SOx. In this case, if it is determined that CS<CS1, namely, that the sulfur component discharge action has not yet been executed for the predetermined time period, the control routine proceeds to step S118. In step S118, the temperature TF is compared once again with the predetermined sulfur component discharge temperature TS. If the temperature TF is equal to or above the sulfur component discharge temperature TS, the control routine returns to the rich condition control of step S112, and continues with the reductant addition and rich condition control. On the other hand, if the temperature TF is less than the sulfur component discharge temperature TS, the control routine returns to the temperature rise control of step S104. The temperature rise control is re-initiated and the subsequent processing is executed. If it is determined in step S116 that CS>CS1, namely, that the sulfur component discharge action has been executed for the predetermined time period, the control routine proceeds to step S120. In step S120, the counter is reset and the rich condition control and the S poisoning regeneration control are completed at the same time.

As described above, according to this embodiment, it is possible to reduce the time taken for S poisoning regeneration and suppress worsening emissions and deterioration in fuel consumption. This is achieved by varying both the subject NOx absorbent 12 inflow exhaust gas flow rate, and the method of adding the reductant, during the temperature rise control and the rich condition control of the S poisoning regeneration control. Alternatively, the flow rate of the exhaust gas flowing to the NOx absorbent 12 may be changed such that it is higher during the execution of the rich condition control means than during the execution of the temperature rise control means.

In addition, according to this embodiment, a passage which bypasses the NOx absorbent is used to regulate the flow rate of the exhaust gas flowing to the NOx absorbent. As a result, it is not necessary to substantially restrict the total amount of exhaust gas discharged from the internal combustion engine. Accordingly, it is possible to execute S poisoning regeneration control throughout a broad range of engine operating ranges.

In addition, according to this embodiment, during the temperature rise control of the S poisoning regeneration control, the amount of reductant which accords with the necessary temperature rise TD is added. Furthermore, during the rich condition control of the S poisoning regeneration control, the amount of reductant which is added is sufficient to cause both the air-fuel ratio of the NOx absorbent inflow exhaust gas to become richer, and to keep the temperature of the NOx absorbent from reaching a temperature at which NOx absorbent deterioration occurs. As a result, it is possible to reduce the time taken for S poisoning regeneration, and suppress worsening of emissions and deterioration in fuel consumption. Furthermore, deterioration of the NOx absorbent caused by over-heating is also prevented.

Figure 6:
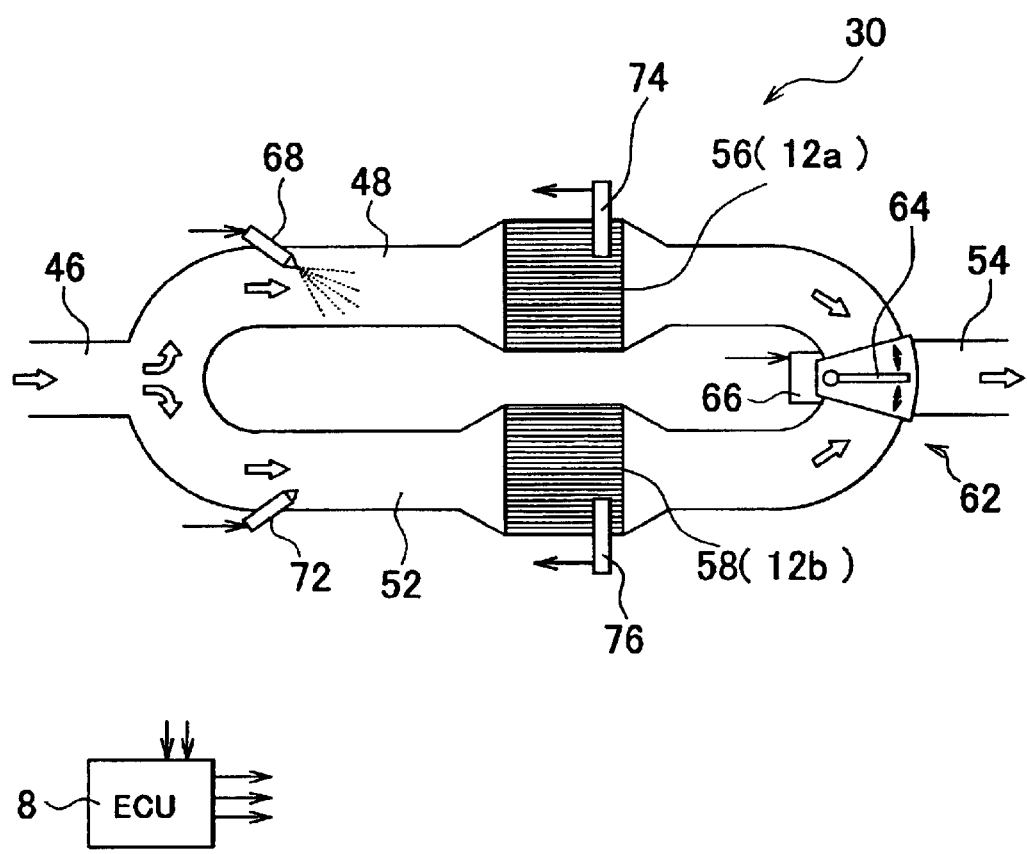
FIG. 6 is an explanatory diagram showing an exhaust gas purification device according to a second embodiment of the invention.

Next, the second embodiment according to the invention will be explained. FIG. 6 is an explanatory diagram showing the structure of the exhaust gas purification device 30 according to the second embodiment of the invention. The flows of exhaust gas within the exhaust gas purification device 30 are shown.

This exhaust gas purification device 30 is installed, like the aforementioned exhaust gas purification device 20 according to the first embodiment, in the portion of the exhaust gas purification device 10 shown in FIG. 1. The exhaust gas purification device 30 forms a section of the exhaust gas passage 6. As shown in FIG. 6, the exhaust gas purification device 30 includes an upstream side main passage 46 communicating with the engine body 2, two branch passages 48 and 52 which diverge and then converge, and a downstream side main passage 54.

Filters supporting the absorbing agents 12, namely a first and a second filters 56 and 58 are disposed, respectively, in the first and the second branch passages 48 and 52. The structure of these filters 56 and 58 supporting NOx absorbents 12, is the same as the structure of the filter 14 used in the first embodiment. Furthermore, within the following description of the embodiment, in order to distinguish the NOx absorbents 12 respectively supported by the first and the second filters 56 and 58, the terms a NOx absorbent 12a and a NOx absorbent 12b will be used, respectively.

A regulation portion 62 is provided at a convergence portion of the two branch passages 48 and 52 on the downstream side of each filter 56 and 58. This regulation portion 62 controls the flow rate ratio of the exhaust gas flowing in the branch passages 48 and 52. The regulation portion 62 is provided with a regulation valve 64 and a driving portion 66 for driving the regulation valve 64. The regulation valve 64 is driven by the driving portion 66 between a first position in which the flow rate of the exhaust gas flowing in the first branch passage 48 is low (for example, $\frac{1}{8}^{th}$ of the exhaust gas flow rate), and a second position in which the flow rate of the exhaust gas flowing in the second branch passage 52 is similarly low. Accordingly, the regulation valve 64 regulates the flows of exhaust gas in each branch passage 48 and 52. However, normally, the regulation valve 64 is positioned in a third position shown in FIG. 6, which is an intermediate position between the first position and the second position. With the regulation valve 64 in this position, the flow rate of the exhaust gas flowing in the first branch passage 48 and the flow rate of the exhaust gas flowing in the second branch passage 52 are substantially the same.

In addition, on the upstream side of the filters 56 and 58 of the branch passages 48 and 52, respectively, a reductant addition portion is provided for addition of a reductant into each branch passage 48 and 52. This reductant is used during the aforementioned S poisoning regeneration control of the NOx absorbent. The reductant addition portion includes two reductant injection nozzles 68 and 72, and a reductant supply pump (not shown) The ECU 8 controls the addition of the reductant, supplied from the reductant supply pump, into the first branch passage 48 via the first reductant injection nozzle 68, and into the second branch passage 52 via the second reductant injection nozzle 72. The additions are executed in an appropriate manner according to respective control steps, and the like. Furthermore, as previously described, a substance which generates reduction components for reducing the hydrocarbons and carbon monoxides, and the like, within the exhaust gas, may be used as the reductant. However, in this embodiment, as in the first embodiment, a diesel oil that is the fuel for the engine body 2 is used as the reductant, in order to avoid complications which occur when storing and replenishing the reductant, and the like.

The regulation portion 62 and the reductant addition portion are controlled by the ECU 8. More particularly, the ECU 8 is connected to the driving portion 66 of the regulation portion 62, and controls a regulation operation of the regulation valve 64 by controlling the driving portion 66. In addition, the ECU 8 is connected to each reductant injection nozzle 68 and 72 of the reductant addition portion, Furthermore, the ECU 8 controls a reductant addition operation of each reductant injection nozzle 68 and 72, by controlling the reductant injection nozzle 32.

Furthermore, according to the second embodiment, in each filter 56 and 58 which support each NOx absorbent 12a and 12b, a first and a second temperature sensors 74 and 76 are provided. These temperature sensors 74 and 76 are temperature estimation means for measuring temperatures of each NOx absorbent 12a and 12b on each filter 56 and 58. The temperature sensors 74 and 76 are connected to the ECU 8, and send measurement results to the ECU 8. The ECU 8 determines an amount of reductant to be added for S poisoning regeneration control of each NOx absorbent 12a and 12b, based upon the received measurement result, and also controls the reductant addition operation of the reductant injection nozzles 68 and 72.

In addition, in this second embodiment, the temperature sensors 74 and 76 are provided such that they measure the temperature of a downstream side end portion of each NOx absorbent 12a and 12b, for the same reason as was described for the first embodiment. Furthermore, in the second embodiment as well, each temperature sensor 74 and 76 is provided in direct connection with each filter 56 and 58 supporting each NOx absorbent 12a and 12b. However, as in the first embodiment, each temperature sensor 74 and 76 may be provided at the downstream side of each filter 56 and 58 supporting each NOx absorbent 12a and 12b, so as to calculate the temperature of each NOx absorbent 12a and 12b by means such as estimating, and the like, the temperature (in particular the temperature at the downstream side edge) of each NOx absorbent 12a and 12b, by measuring the temperature of the exhaust gas.

Figure 7:
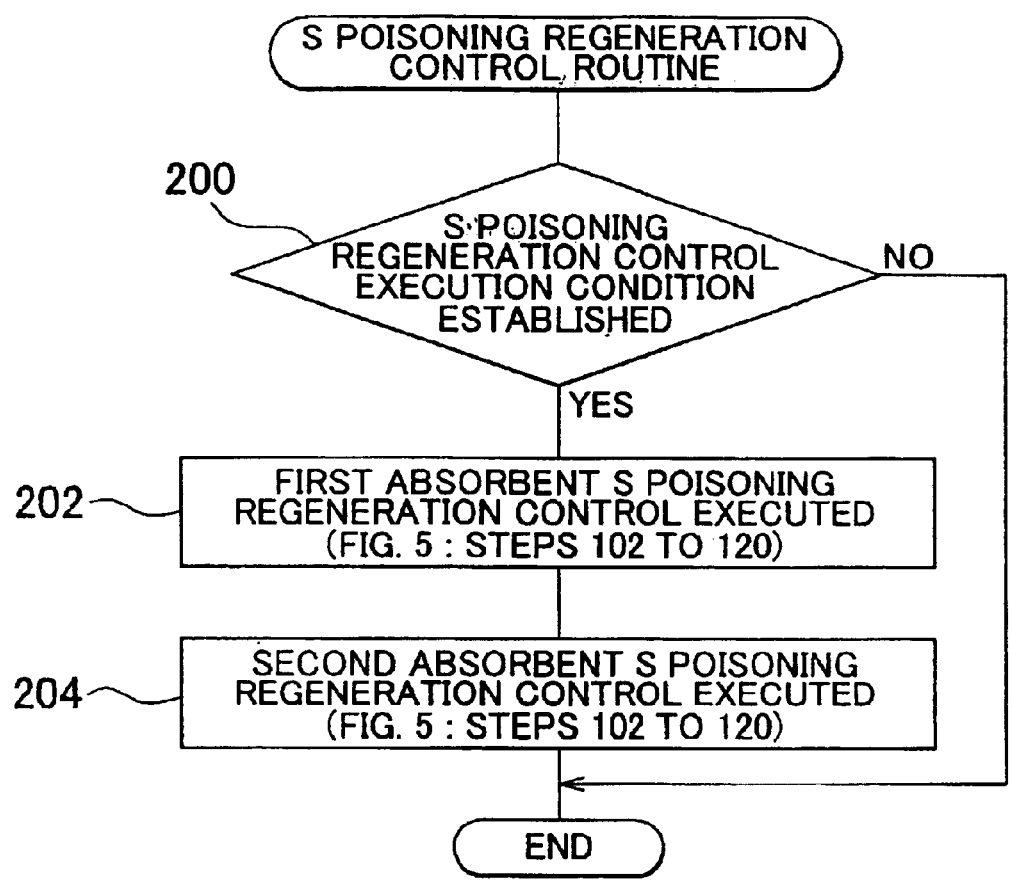
FIG. 7 is a flow chart showing a control routine for S poisoning regeneration control of a NOx absorbent according to the second embodiment.

Next, the operation of the second embodiment will be described. A control routine for the S poisoning regeneration control of the NOx absorbent according to this embodiment, is the same, for essential sections, as the control routine of the first embodiment, shown in FIG. 5. However, according to the second embodiment, there are NOx absorbents 12 used for the S poisoning regeneration control in two locations. Accordingly, it is necessary to execute the control routine for S poisoning regeneration control shown in FIG. 5 twice, in order to execute the S poisoning regeneration control of both the NOx absorbent 12a and the NOx absorbent 12b. FIG. 7 shows the control routine for the entire S poisoning regeneration control according to this embodiment. This control routine is executed by an interrupt at constant intervals.

FIG. 7 shows a case when S poisoning regeneration control is being executed successively with respect to the first and second NOx absorbents 12a and 12b, when an execution condition for S poisoning regeneration control of the first and second NOx absorbents 12a and 12b has been established. The S poisoning regeneration control execution condition is the same as that for the first embodiment. In step S200, it is determined whether the determined execution condition for the S poisoning regeneration control has been established. For example, it may be determined whether the running distance of the vehicle since the last time S poisoning regeneration control was executed exceeds a predetermined set value.

The operation of the essential sections of the S poisoning regeneration control executed with respect to the first and the second NOx absorbents 12a and 12b in step S202 and step S204, is basically the same as the operation of step S102 to step S120 of the S poisoning regeneration control according to the first embodiment which was described with reference to FIG. 5. The corresponding relationship of elements (for example, the reductant injection nozzle 32 and the reductant injection nozzles 68 and 72, or the temperature sensor 34 and the temperature sensors 74 and 76) and the operation of the regulation valve 64, and the like, are clear from FIG. 2 and FIG. 6 and the previous description. Accordingly, a detailed description will be omitted here. (It should be noted that the branch passage in which S poisoning regeneration control is not being executed corresponds to the by-pass passage 18 according to the first embodiment.)

However, according to the second embodiment, when S poisoning regeneration control is being executed with respect to one of the NOx absorbents (hereinafter referred to as the "subject NOx absorbent), if the subject NOx absorbent inflow exhaust gas flow rate is regulated, then the exhaust gas which by-passes the subject NOx absorbent passes through the other NOx absorbent without being subjected to S poisoning regeneration control. As a result, even when the S poisoning regeneration control is being executed, exhaust gas which has not passed through the NOx absorbent is prevented from being discharged to the atmosphere.

Figure 8:
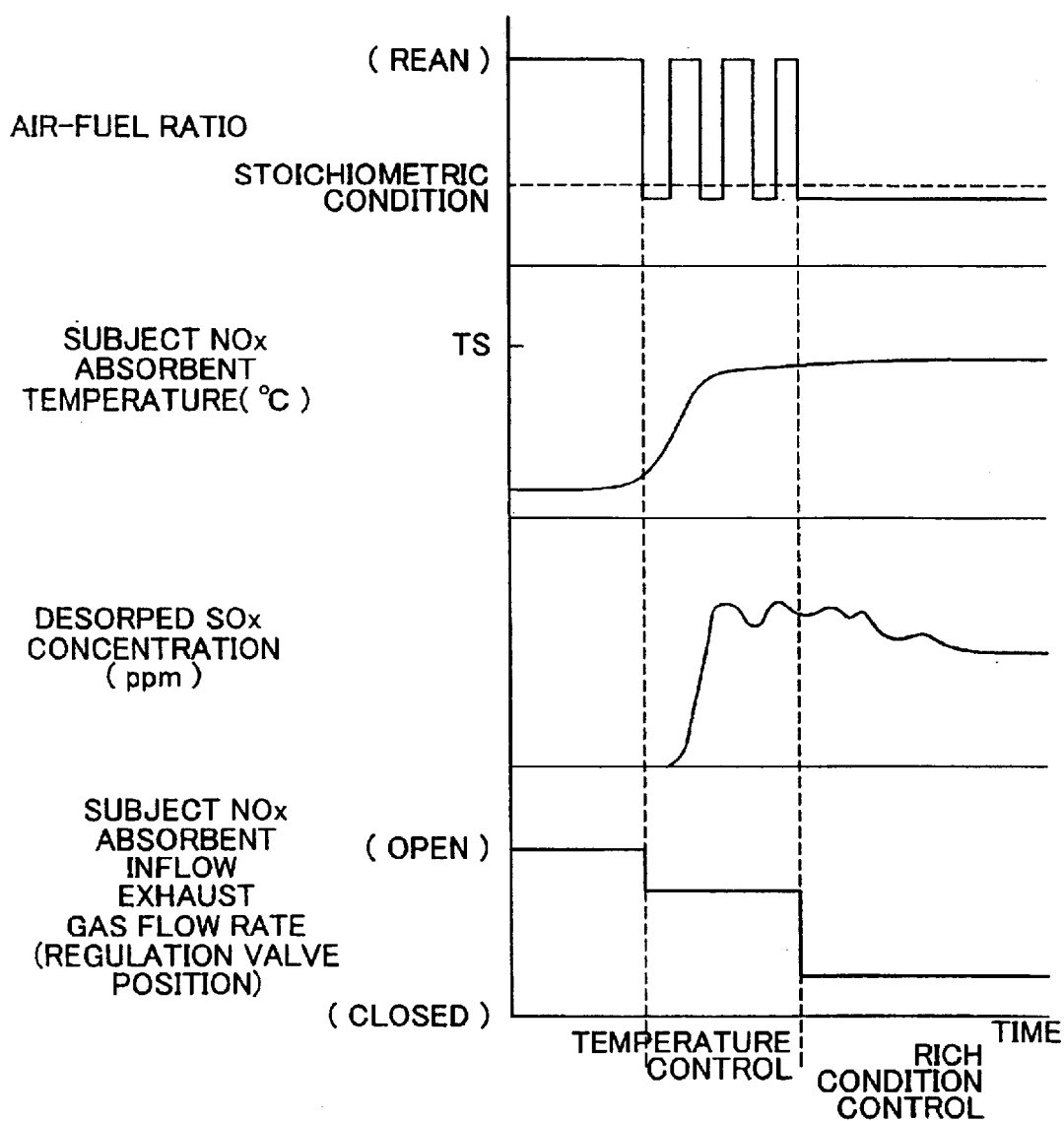
FIG. 8 is a graph showing an example of the S poisoning regeneration control according to the second embodiment, which illustrates changes over time of the NOx absorbent which is subject to S poisoning regeneration control, with respect to: an air-fuel ratio of exhaust gas flowing into the subject NOx absorbent; a temperature of the subject NOx absorbent; a concentration of desorped SOx; and, a flow rate (a regulating valve position) of the exhaust gas flowing to the subject NOx absorbent.

FIG. 8 is a graph showing an example of the S poisoning regeneration control according to the second embodiment. The graph illustrates changes over time of the NOx absorbent which is subject to the S poisoning regeneration control, with respect to: an air-fuel ratio of exhaust gas flowing into the subject NOx absorbent; a temperature of the subject NOx absorbent; a concentration of discharged SOx; and, a flow rate (a regulating valve position) of exhaust gas flowing into the subject NOx absorbent. Moreover, it should be noted, that the bracketed (Open) and (Shut) in the section of FIG. 8 which concerns the subject NOx absorbent inflow exhaust gas flow rate, indicate the position of the regulation valve with respect to the subject NOx absorbent. For example, if the subject NOx absorbent is the first NOx absorbent 12a, the (Open) position corresponds to the second position side of the regulation valve 64, and the (Closed) position corresponds to the first position side of the regulation valve 64.

In the example shown in FIG. 8, during temperature rise control, regulation is executed such that the subject NOx absorbent inflow exhaust gas flow rate becomes a desired rate. Furthermore, reductant addition is also executed and a change between a lean and a rich condition is repeated. As a result, the temperature of the subject NOx absorbent rises rapidly and reaches the sulfur component discharge temperature TS. This temperature rise is accompanied by an increase in the desorped SOx concentration. When a rich condition is switched to, the subject NOx absorbent inflow exhaust gas flow rate is lowered. At the same time, a reductant addition method is changed such that the air-fuel ratio is maintained at a substantially stoichiometric condition or a rich condition. As a result, the necessary temperature and air-fuel ratio conditions for discharge of the absorbed SOx are satisfied, and the discharge (desorption) of SOx continues.

As will be clearly apparent from the proceeding description of the embodiment, according to this embodiment, the same operational effects (namely, by changing both the subject NOx absorbent inflow exhaust gas flow rate and the addition method for the reductant during the temperature rise control and the rich condition control, it is possible to: reduce the regeneration time; suppress deterioration in fuel consumption and worsening emissions; expand the engine operation range in which the S poisoning regeneration control using regulation of the inflowing exhaust gas flow rate can be executed; and, prevent deterioration of the NOx absorbent caused by overheating of the NOx absorbent) as the first embodiment can be obtained. In addition, according to the second embodiment described above, when the S poisoning regeneration control is executed with respect to one of the NOx absorbents disposed in one of the branch passages, the subject NOx absorbent inflow exhaust gas flow rate is regulated. Accordingly, the remaining exhaust gas is fed into the other branch passage and passes through the other NOx absorbent disposed in the respective branch passage. As a result, even when the S poisoning regeneration control is being executed, exhaust gas which has not passed through any of the NOx absorbents is prevented from being discharged to the atmosphere.

Figure 9A:
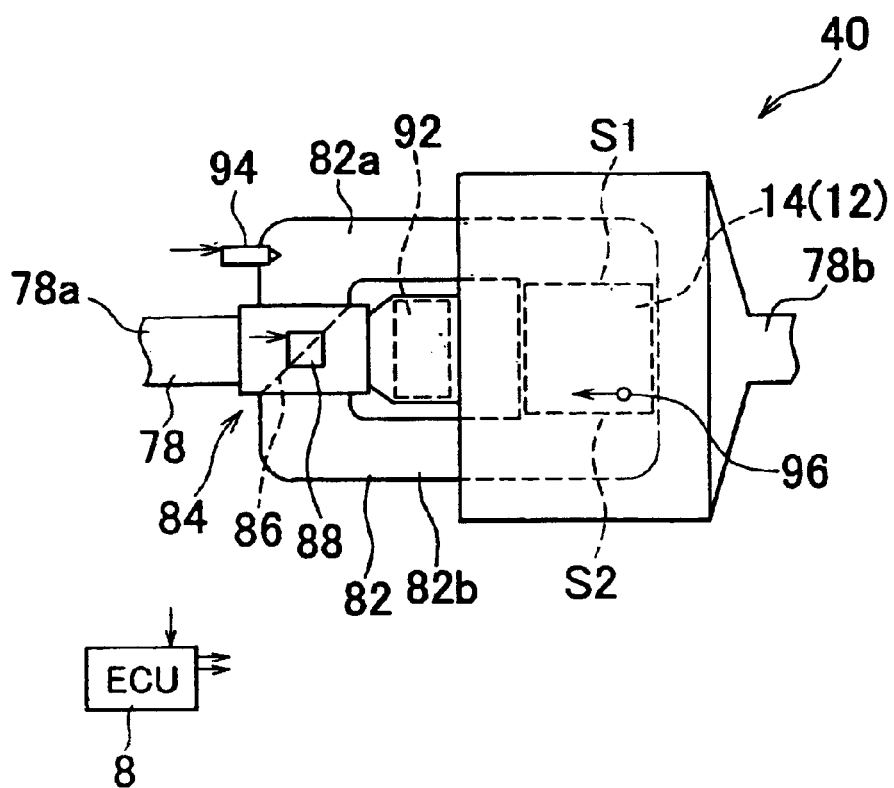
FIG. 9A is an schematic explanatory view of an exterior appearance of an exhaust gas purification device according to a third embodiment as viewed from above.
Figure 9B:
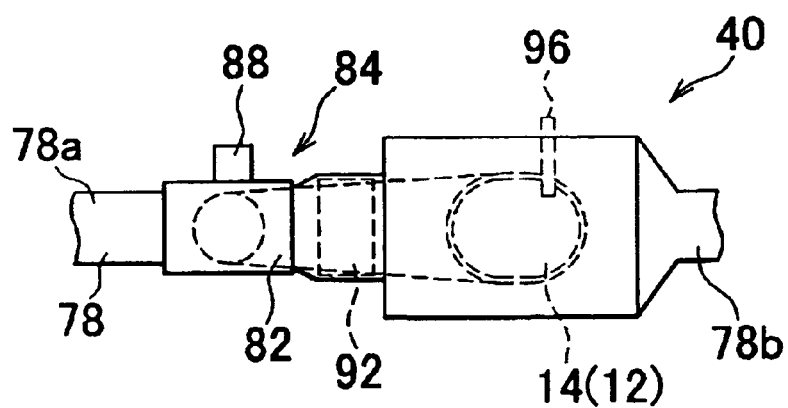
FIG. 9B is a schematic explanatory view showing an exterior appearance of the exhaust gas purification device according to the third embodiment as viewed from a side.
Figure 10A:
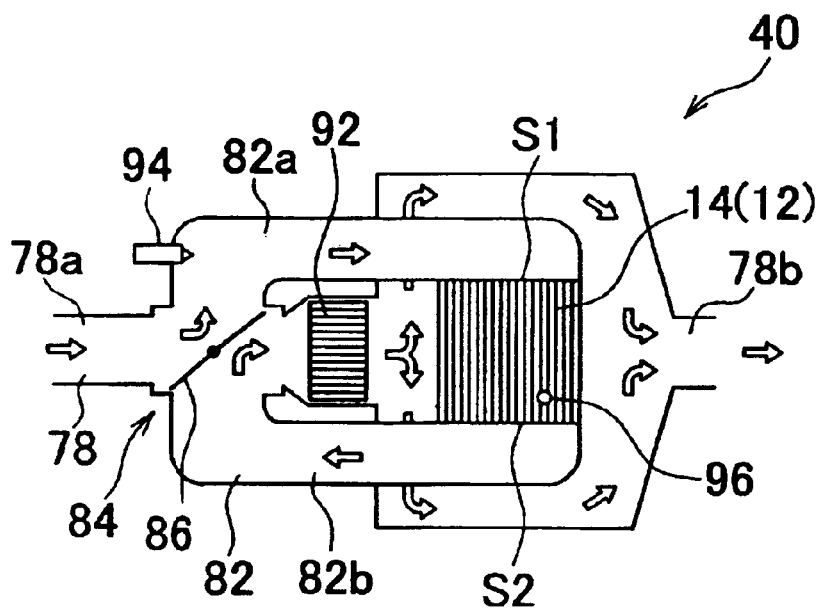
FIG. 10A is an explanatory figure showing a cross section of the exhaust gas purification device according to the third embodiment as viewed from above, and shows flows of exhaust gas when a passage switching valve is located in a first position.
Figure 10B:
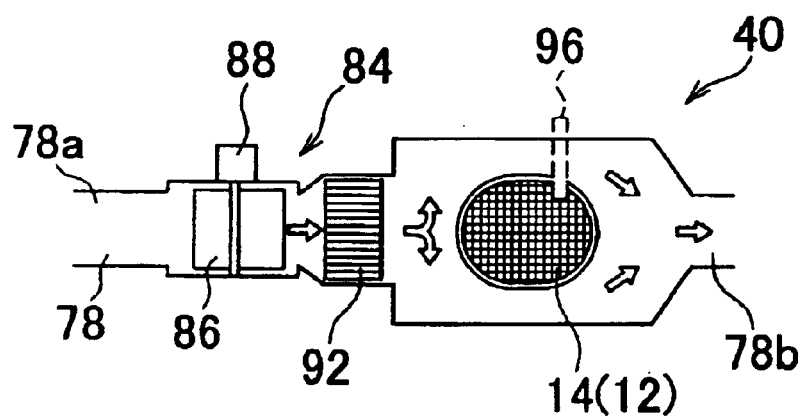
FIG. 10B is an explanatory figure showing the cross section of the exhaust gas purification device according to the third embodiment as viewed from the side, and shows the flows of the exhaust gas when the passage switching valve is located in the first position.

Next, the third embodiment according to the invention will be described. FIG. 9 is an schematic explanatory figure of an exterior appearance of the exhaust gas purification device 40 according to a third embodiment. FIG. 9A and FIG. 9B show the exhaust gas purification device 40 as viewed from above and as viewed from a side, respectively. In addition, FIG. 10A and FIG. 10B are explanatory figures showing cross sectional views of the exhaust gas purification device 40 as viewed from above and as viewed from the side, respectively. Flows of exhaust gas within the exhaust gas purification device 40 are shown.

This exhaust gas purification device 40, like the aforementioned exhaust gas purification devices 20 and 30, according to the other embodiments, is disposed in the portion of the exhaust gas purification device 10 shown in FIG. 1, and forms a section of the exhaust gas passage 6. As shown in FIG. 9, the exhaust gas purification device 40 includes a main passage 78, and a circular passage 82 which is connected to the main passage 78. A passage switching portion 84 is provided at a connection portion of the main passage 78 and the circular passage 82. The passage switching portion 84 is provided with a passage switching valve (regulation valve) 86 that both switches the route of the exhaust gas, and also regulates a flow rate of the exhaust gas flowing to the NOx absorbent 12, as will be described hereinafter. The passage switching portion 84 is also provided with a driving portion 88 for driving the passage switching valve 86. The passage switching portion 84 has four sides, which form two sets of horizontally opposing sides. These sides connect with four passages. Main passage portions 78a and 78b, which form two portions of the main passage 78, are connected, respectively, with the sides of one of the sets of horizontally opposed sides. Furthermore, circular passage portions 82a and 82b, which form two portions of the circular passage 82, are connected, respectively, with the sides of the other set of horizontally opposed sides.

The filter 14 supporting the same NOx absorbent 12 as used in the other embodiment is provided in the circular passage 82. The first circular passage portion 82a connects with a first surface S1 side of the filter 14 (the NOx absorbent 12), and the second circular passage portion 82b connects with a second surface S2 side thereof. In addition, a separate NOx absorbent 92 is provided in the downstream side main passage portion 78b. The downstream side main passage portion 78b is formed so as to surround the portion housing the filter 14 of the circular passage 82.

In addition, the exhaust gas purification device 40 includes a reductant addition portion for addition of reductant into the circular passage 82. This reductant is used during the execution of the S poisoning regeneration control of the NOx absorbent. In this embodiment, this reductant addition portion is assembled to the first circular passage portion 82a. The reductant addition portion includes a reductant injection nozzle 94, and a reductant supply pump (not shown in the figure). The ECU 8 controls the addition of the reductant, supplied from the reductant supply pump, into the first circular passage portion 82a. This addition is executed in an appropriate manner using the reductant injection nozzle 94, according to control steps, and the like. Furthermore, in this embodiment, as in the other embodiments, the diesel oil that is the fuel for the engine body 2 is used as the reductant.

The passage switching portion 84 and the reductant addition portion are controlled by the ECU 8. More particularly, the ECU 8 is connected to the driving portion 88 of the passage switching portion 84, and controls operation of the passage switching valve 86 through control of the driving portion 88. In addition, the ECU 8 is connected to the reductant injection nozzle 94 of the reductant addition portion, and controls the reductant addition operation of the reductant injection nozzle 94 through control of the reductant injection nozzle 94 (thereof).

In addition, according to the second embodiment, a temperature sensor 96 is provided in the filter 14 which supports the NOx absorbent 12. The temperature sensor 96 is temperature estimation means for measuring the temperature of the NOx absorbent 12. The temperature sensor 96 is connected to the ECU 8, and sends measurement results to the ECU 8. The ECU 8 determines an amount of reductant to be added for the S poisoning regeneration control of the NOx absorbent 12, based upon the received measurement result, and also controls the reductant addition operation of the reductant injection nozzle 94. In addition, according to this embodiment, for the same reason as was given for the first embodiment, the temperature sensor 96 is provided at a downstream side end portion of the NOx absorbent 12 so as to measure the temperature during the S poisoning regeneration control of the NOx absorbent 12.

Furthermore, according to this embodiment, the temperature sensor 96 is provided in direct connection with the filter 14 supporting the NOx absorbent 12. However, the temperature sensor 96 may be provided, in a similar manner to the previous embodiments, at the downstream side of the filter 14 supporting the NOx absorbent 12. Namely, the temperature sensor 96 may be provided in the second circular passage portion 82*b*, so as to derive the temperature of the NOx absorbent 12 by means such as estimating, and the like, the temperature (in particular, the temperature at the downstream side edge) of the NOx absorbent 12, by measuring the temperature of the exhaust gas.

The exhaust gas which flows into the exhaust gas purification device 40 flows without exception through the main passage 78, and may selectively flow through the circular passage 82, as will be descried hereinafter.

FIG. 10A and FIG. 10B show flows of exhaust gas within the exhaust gas purification device 40 when the passage switching valve 86 is located in a first position. In this case, the exhaust gas flowing within the exhaust gas purification device 40 flows through the upstream side main passage portion 78*a* to the passage switching portion 84, then flows through the first circular passage portion 82*a* and the second circular passage portion 82*b* in that order, and returns to the passage switching portion 84. While doing this, the exhaust gas flows from the first surface S1 to the second surface S2 of the filter 14 supporting the NOx absorbent 12. The exhaust gas which has returned to the passage switching portion 84 flows into the downstream main passage portion 78*b*, and having passed through the separate NOx absorbent 92, is discharged from the exhaust gas purification device 40. In addition, as shown in FIG. 10A and FIG. 10B, the exhaust gas which has passed through the NOx absorbent 92, passes through the portion of the main passage portion 78*b* that is formed so as to enclose the portion housing the filter 14 of the circular passage 82.

Figure 11:
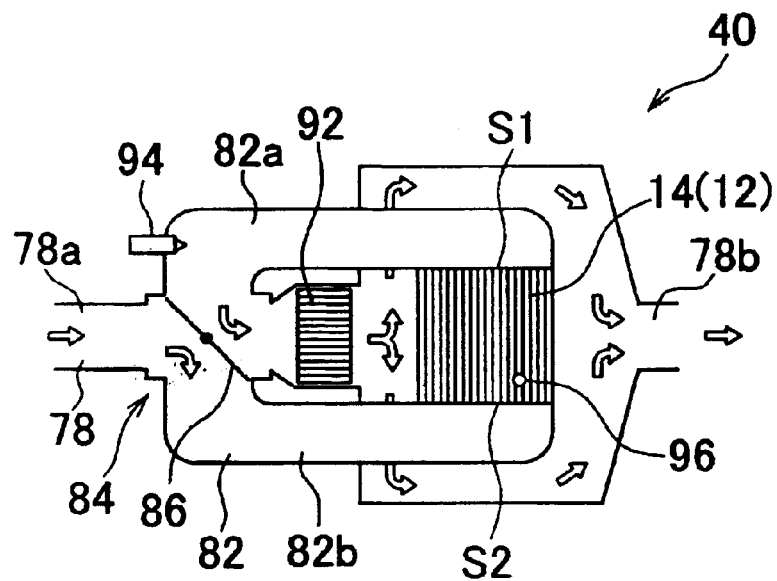
FIG. 11 is an explanatory figure showing the cross section of the exhaust gas purification device according to the third embodiment as viewed from above, and shows the flows of the exhaust gas when the passage switching valve is located in a second position.

FIG. 11 shows the flows of exhaust gas in the exhaust gas purification device 40, in the same manner as FIG. 10A, when the passage switching valve 86 is positioned in a second position. In this case, the exhaust gas flows in a manner which is almost identical to that shown in FIG. 10A. However, the direction of flow along the circular passage 82 is exactly opposite. More specifically, the exhaust gas which has flowed to the passage switching portion 84, flows through the second circular passage portion 82*b* and the first circular passage portion 82*a* in that order, and returns to the passage switching portion 84. While doing so, the exhaust gas flows from the second surface S2 to the first surface S1 of the filter 14 supporting the NOx absorbent 12. Accordingly, it is possible to reverse the direction of flow of the exhaust gas flowing to the NOx absorbent 12. As a result, during normal usage, it is possible to prevent variation in the extent to which different portions of the NOx absorbent are utilized, etc., thus making efficient use of all of the NOx absorbent possible.

Figure 12:
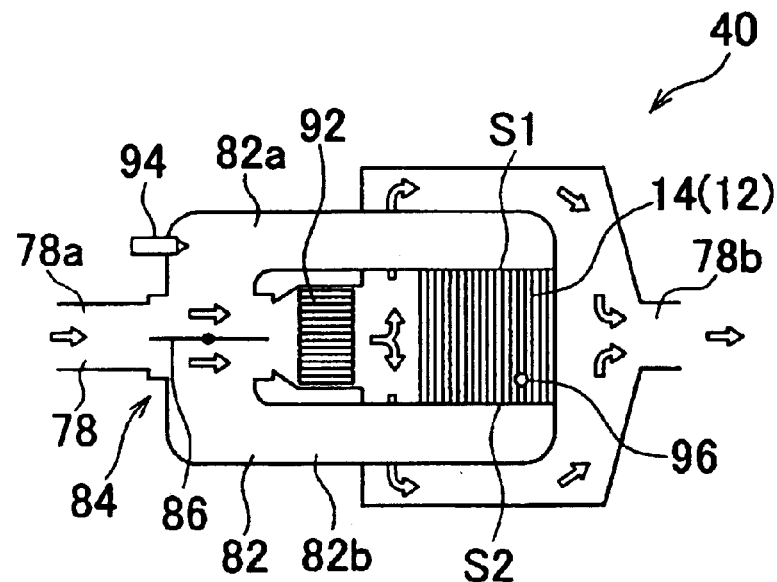
FIG. 12 is an explanatory figure showing the cross section of the exhaust gas purification device according to the third embodiment as viewed from above, and shows the flows of the exhaust gas when the passage switching valve is located in a third position.

FIG. 12 shows the flows of exhaust gas in the exhaust gas purification device 40, in the same manner as FIG. 10A and FIG. 11, when the passage switching valve 86 is positioned in a third position. This third position is an intermediate position between the first position and the second position. It should be noted that the passage switching valve 86 is temporarily positioned in the third position, when the passage switching valve 86 is changed between the first position and the second position. When the passage switching valve 86 is positioned in the third position, almost all of the exhaust gas flowing into the passage switching portion 84 flows straight into the downstream main passage portion 78*b*, and, having passed through the NOx absorbent 92, is discharged from the exhaust gas purification device 40.

As described above, when the passage switching valve 86 is in either one of the first and the second position, the exhaust gas passes through the filter 14 supporting the NOx absorbent 12, and following this, also passes through the NOx absorbent 92. On the other hand, when the passage switching valve 86 is in the third position, almost all of the exhaust gas is discharged from the exhaust gas purification device 40 having only passed through the NOx absorbent 92, and without passing through the filter 14 supporting the NOx absorbent 12. Accordingly, during normal operation, the passage switching valve 86 is positioned in one of the first position and the second position so that the exhaust gas is purified by passing through the filter 14 supporting the NOx absorbent 12 and the NOx absorbent 92. In addition, the position of the passage switching valve 86 can be regulated between the first position and the second position using the driving portion 88, as necessary.

Next, the operation of the third embodiment will be described. However, it should be noted that, the operation of a S poisoning regeneration control of this embodiment is fundamentally the same as the operation of the S poisoning regeneration control according to the first embodiment. The control routine of this S poisoning regeneration control is shown in FIG. 5. In addition, the corresponding relationship of elements (for example, the reductant injection nozzle 32 and the reductant injection nozzle 94, or the temperature sensor 34 and the temperature sensor 96), and the like, are clear from the figures and the previous description. Accordingly, a detailed description will be omitted here. However, the regulation of the NOx absorbent inflow exhaust gas flow rate when using the passage switching valve 86 for, respectively, the temperature rise control and the rich condition control of this embodiment, is different to the regulation executed in the first embodiment. Accordingly, a description will be provided hereinafter.

The regulation of the NOx absorbent inflow exhaust gas flow rate for the temperature rise control is executed in step S108 of FIG. 5. The regulation of the NOx absorbent inflow exhaust gas flow rate at this point, is executed by regulating the passage switching valve 86 using the driving portion 88. As a result of this regulation, exhaust gas flows from the first surface S1 toward the second surface S2 of the filter 14. In other words, the passage switching valve 86 is regulated so as to be, at the very least, on the first position side of the third position.

Accordingly, if the passage switching valve 86 is in the second position when the execution condition for S poisoning regeneration control is established, the previously described regulation causes the direction of the exhaust gas passing through the filter 14 supporting the NOx absorbent 12 to be reversed. In other words, the regulation of the NOx absorbent inflow exhaust gas flow rate at this point includes reversing the flow direction of the exhaust gas. If the flow direction in which the the exhaust gas flows from the first surface S1 toward the second surface S2 of the filter 14 is taken to be a flow rate forward direction, then this reversal of flow direction equates to regulating the flow rate direction from a reverse flow rate direction to the forward flow rate direction. This regulation can be regarded as one type of flow rate regulation. The reason for executing regulation such that the exhaust gas flows from the first surface S1 to the second surface S2 of the filter 14 is that an execution position for reductant addition during the S poisoning regeneration control is on the upstream side of the filter 14. In other words, the position of the reductant injection nozzle 94 is located on the upstream side of the filter 14 supporting the NOx absorbent 12.

In addition, the regulation of the NOx absorbent inflow exhaust gas flow rate at this point is executed, as in the other embodiments, such that there is sufficient oxygen for combustion of the reductant added in order to raise the temperature of the NOx absorbent 12. For example, the passage switching valve 86 may be positioned in the first position such that all of the exhaust gas discharged from the engine body 2 flows from the first surface S1 toward the second surface S2 of the NOx absorbent 12 (the filter 14). Alternatively, in a similar manner to the previous embodiments, in the case when the flow rate of the exhaust gas discharge from the engine body 2 is high, it is undesirable if all of the exhaust gas is fed to the NOx absorbent 12. Accordingly, the position of the passage switching valve 86 is regulated between the first and the third positions, such that only a portion of the exhaust gas discharged from the engine flows to the NOx absorbent 12. In this case, the exhaust gas which does not flow to the NOx absorbent 12, namely, the exhaust gas which by-passes the NOx absorbent 12, passes only through the separate NOx absorbent 92 and is then discharged from the exhaust gas purification device 40.

On the other hand, the regulation of the NOx absorbent inflow exhaust gas flow rate for the rich condition control is executed in step S110 of FIG. 5. In step S110, the reduction of the NOx absorbent inflow exhaust gas flow rate is executed. Accordingly, there is a reduction in the amount of reductant which needs to be added in order to form a richer air-fuel ratio of the NOx absorbent inflow exhaust gas. As a result, deterioration in fuel consumption and worsening of emissions is suppressed. This reduction of the NOx absorbent inflow exhaust gas flow rate is executed by driving the passage switching valve 86 using the driving portion 88 to the third position side. This causes the NOx absorbent inflow exhaust gas to flow from the first surface S1 toward the second surface S2 of the NOx absorbent 12 (the filter 14), and the flow rate of the exhaust gas to become, at least, less than the NOx absorbent inflow exhaust gas at the time of the aforementioned temperature rise control.

Figure 13A:
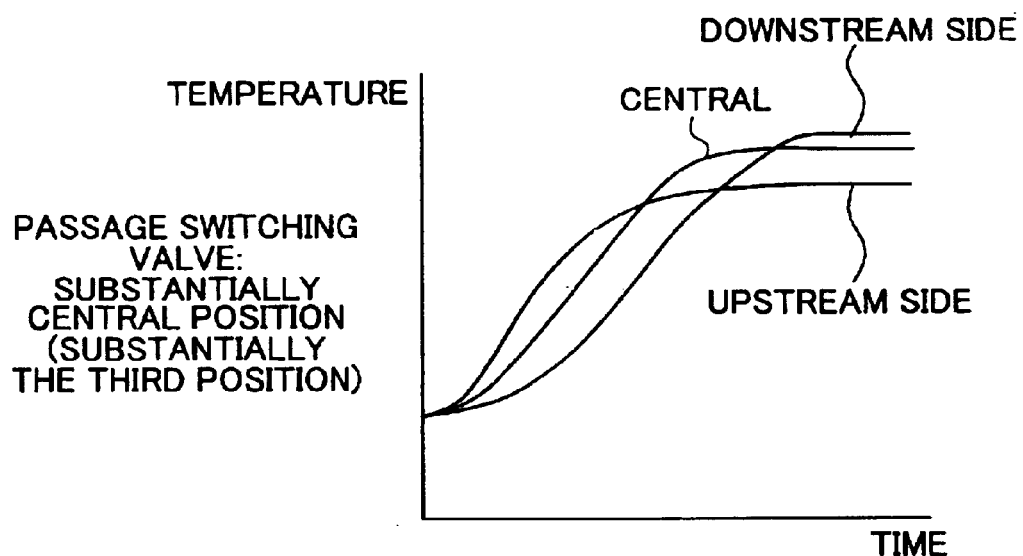
FIG. 13A is a graph showing temperature rises of the NOx absorbent with respect to each position thereof (an upstream side position, a central position, and a downstream side position with respect to the flow of exhaust gas) when the passage switching valve is in a substantially central position (substantially the third position), according to the third embodiment.
Figure 13B:
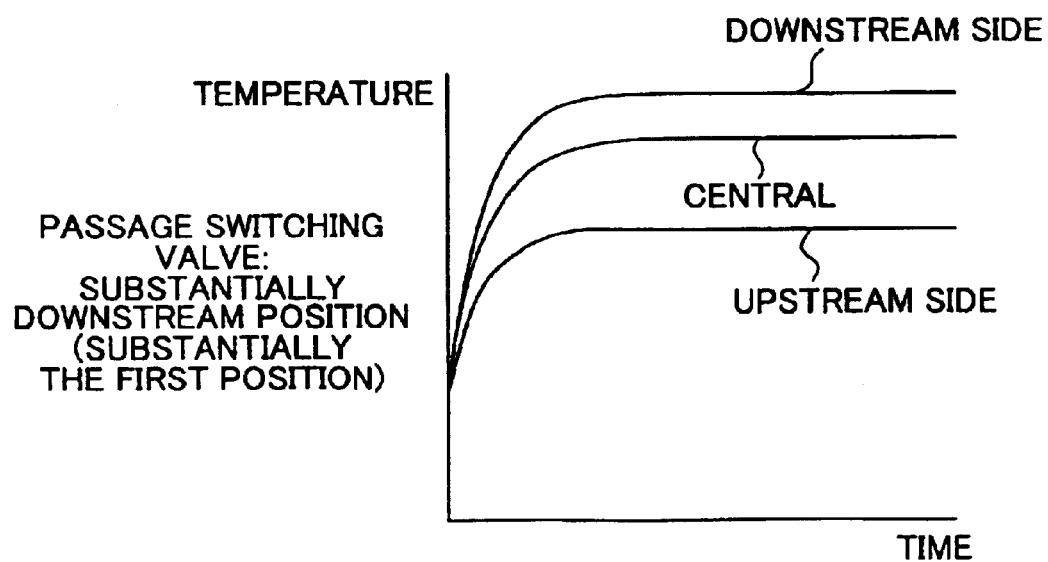
FIG. 13B is a graph showing temperature rise of the NOx absorbent with respect to each position thereof (an upstream side position, a central position, and a downstream side position with respect to the flow of exhaust gas) when the passage switching valve is in a downstream position (the first position), according to the third embodiment.

FIG. 13A and FIG. 13B show, respectively, the temperature rises of the NOx absorbent 12 with respect to each position thereof (an upstream side position, a central position and a downstream side position with respect to the exhaust gas flow) when the passage switching valve 86 is in the substantially central position (substantially the third position) and in a downstream position (the fist position) according to the embodiment. As can clearly be seen from these figures, during the temperature rise control, it is possible to execute temperature rise more rapidly when the passage switching valve 86 is positioned on the first position side, and the flow rate of the inflow exhaust gas is increased. In addition, in general terms, regardless of the position of the passage switching valve 86, the maximum temperature of the exhaust gas occurs at a position on the downstream side with respect to the exhaust gas flow. Accordingly, it is apparent from the figures that in order to prevent deterioration of the NOx absorbent 12 caused by over heating, it is preferable to monitor the temperature at the downstream side edge of the NOx absorbent 12.

Figure 14:
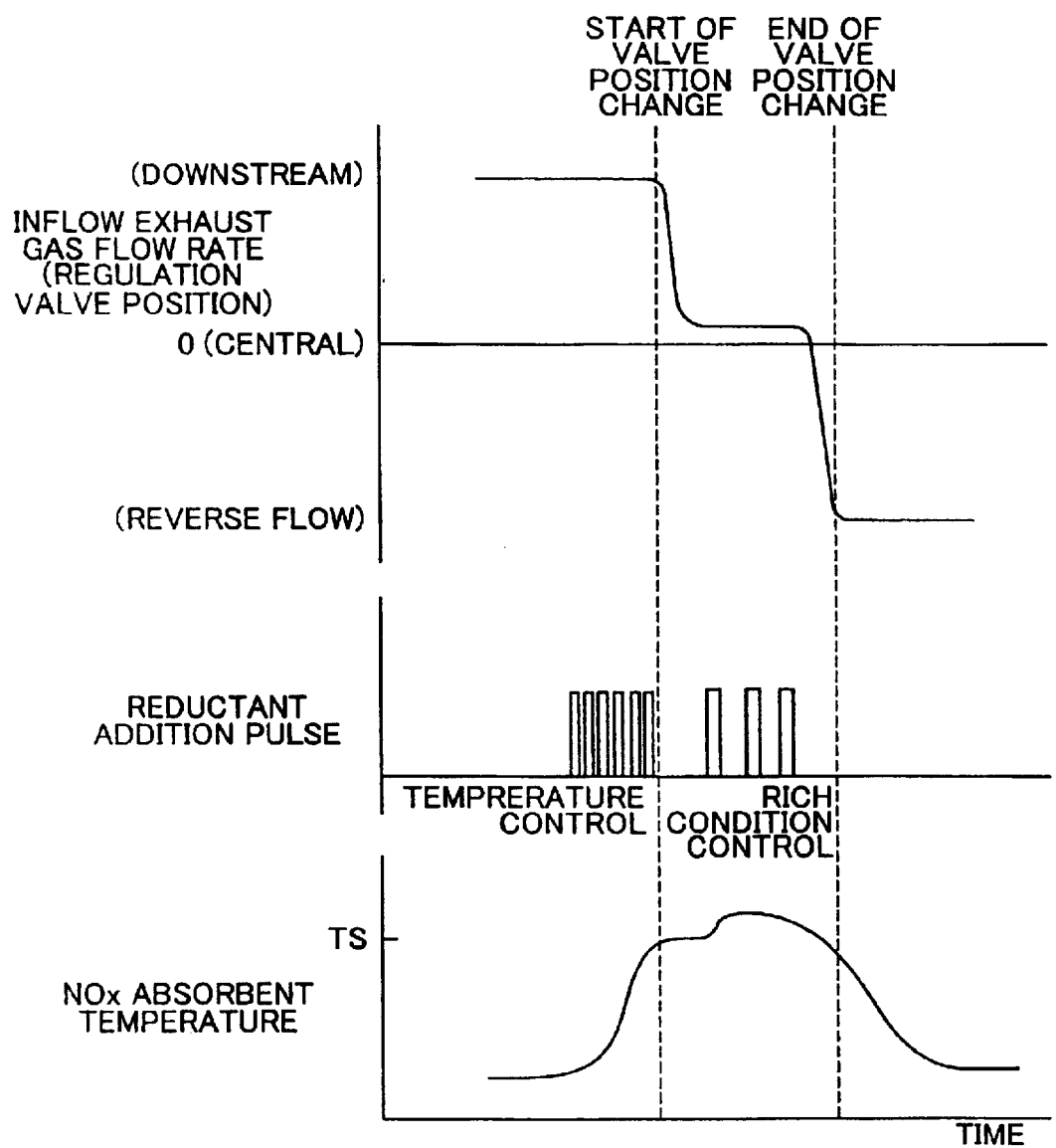
FIG. 14 is a graph showing an example of the S poisoning regeneration control according to the third embodiment, which illustrates changes over time of the NOx absorbent with respect to a NOx absorbent inflow exhaust gas flow rate (the position of the passage switching valve), a reductant addition pulse, and a temperature of the NOx absorbent.

Furthermore, FIG. 14 is a graph showing an example of the S poisoning regeneration control according to this embodiment. This graph illustrates changes over time with respect to: the flow rate (the position of the passage switching valve) of the exhaust gas flowing into the NOx absorbent 12; a reductant addition pulse; and, the temperature of the NOx absorbent 12. In addition, the bracketed changing valve positions, i.e., (Downstream), (Central) and (Reverse Flow), shown in the section of FIG. 14 related to the flow rate of exhaust gas flowing to the NOx absorbent 12, correspond to the first, third and second positions of the passage switching valve 86, respectively.

In the example shown in FIG. 14, during the temperature rise control, the passage switching valve 86 is held in the downstream position (the first position), the inflowing exhaust gas flow rate is maintained at a comparatively high level, and the reductant is added according to a pulse having high frequency and short continuation time. As a result, the temperature of the NOx absorbent 12 rises rapidly until the sulfur component discharge temperature TS is reached, and thus the necessary temperature condition for discharge of the absorbed SOx is realized. When rich condition control is switched to, the passage switching valve 86 is driven to the substantially central position (substantially the third position), the flow rate of the exhaust gas flowing to the NOx absorbent 12 is reduced, and a reductant addition method is changed such that additions occur according to a pulse having low frequency and long continuation time. As a result, the air-fuel ratio having a substantially stoichiometric condition or a rich condition is maintained. Accordingly, both the necessary temperature and air-fuel ratio conditions for discharge of absorbed SOx are satisfied, and discharge (desorption) of SOx is executed.

As is clear from the proceeding description of this embodiment, according to this embodiment, the same beneficial operational effects as the first embodiment can be obtained. In addition, during the execution of the S poisoning regeneration control, exhaust gas is prevented from being discharged to the atmosphere without passing through any of the NOx absorbent. In addition, as previously described, according to this embodiment, it is possible to reverse the flow direction of the exhaust gas flowing to the NOx absorbent 12. This makes it possible, during normal use, to prevent variation in the extent to which different portions of the NOx absorbent are utilized, etc., thus making efficient use of all of the NOx absorbent possible.

According to this invention, as described above, during the temperature rise control and the rich condition control of the S poisoning regeneration control, it is possible to reduce the regeneration time for the S poisoning and suppress deterioration in fuel consumption and worsening emissions. This is achieved by changing both the flow rate of the exhaust gas flowing to the subject NOx absorbent and the reductant addition method. In the case of each of the previously described embodiments, examples were presented in which the inflow exhaust gas flow rate and the reductant addition method were both changed for the temperature rise control and the rich condition control. However, the same effects may be obtained in both the temperature rise control and the rich condition control by changing just one of the inflow exhaust gas flow rate and the reductant addition method.

In addition, according to each of the aforementioned embodiments, it is not necessary to substantially restrict the total amount of exhaust gas discharged from the internal combustion engine. Accordingly, it is possible to execute the S poisoning regeneration control throughout a broad range of engine operating ranges. This is achieved by regulating the subject NOx absorbent inflow exhaust gas flow rate, by utilizing a passage for by-passing the subject NOx absorbent. However, the invention is not limited to this, and may regulate the subject NOx absorbent inflow exhaust gas flow rate by other means.

In addition, according to each of the embodiments, deterioration, and the like, of the NOx absorbent caused by overheating is prevented. This is achieved by adding the amount of reductant which accords with the necessary temperature rise, during the temperature rise control of the S poisoning regeneration control. In addition, the addition of the reductant during the rich condition control of the S poisoning regeneration control is executed such that the temperature of the NOx absorbent is kept from reaching the temperature at which deterioration of the NOx absorbent occurs. However, the invention is not limited to this, and may be realized with a different configuration.

Furthermore, according to each of the embodiments, the NOx absorbent is supported in the wall surfaces of the exhaust gas passages within the filter. However, the invention is not limited to this, and the NOx absorbent and the filter may be separate and independent elements.

In addition, according to each of the embodiments, the condition for starting reduction of the NOx absorbent inflowing exhaust gas flow rate when switching from the temperature rise control to the rich condition control, is whether the temperature TF of the NOx absorbent is equal to or above the sulfur component discharge temperature TS. However, this condition may be changed to the condition that, the temperature TF of the NOx absorbent is equal to or above a predetermined temperature less than the sulfur component discharge temperature TS. In this case, slow reduction over a period of time of the NOx absorbent inflowing exhaust gas flow rate to the desired flow rate begins when the condition is satisfied. When the desired flow rate is realized, the temperature TF is equal to or above the sulfur component discharge temperature TS.

Alternatively, bearing in mind temperature reduction following the switch to the rich condition control, the aforementioned temperature used as the condition for switching from the temperature rise control to the rich condition control (namely, a target value for temperature rise control), may be set higher than the sulfur component discharge temperature. In this case, it should be noted that, the target temperature should be set so as to be lower than the temperature at which deterioration of the NOx absorbent occurs.

In addition, according to each of the embodiments, the invention is applied to the diesel engine. However, the invention is not limited to this, and can be applied to other types of internal combustion engine.

According to the embodiments, during the rich condition control, if the temperature of the NOx absorbent subject to the S poisoning regeneration control becomes lower than a predetermined temperature, it is possible to execute the temperature rise control once again. As a result, even if the temperature of the NOx absorbent falls once, the S poisoning regeneration control can be executed once again, starting from temperature rise control. As a result, it is possible to reliably achieve a predetermined level of S poisoning regeneration.

In addition, according to the embodiments, the sulfur component discharge temperature is the predetermined temperature. As a result, the temperature of the NOx absorbent is inevitably raised to the sulfur component discharge temperature, and thus S poisoning regeneration control can be executed more reliably.

In addition, according to the embodiments, temperature of the NOx absorbent at the downstream side edge may be estimated. This makes it possible to monitor the temperature of the downstream side edge of the NOx absorbent. Generally speaking, the temperature reaches a maximum at this point. As a result, it is possible to more reliably prevent deterioration of the NOx absorbent caused by overheating.

What is claimed is:

1. An exhaust gas purification device comprising:
   a NOx absorbent which is disposed in an exhaust gas passage through which exhaust gas discharged from an internal combustion engine passes, this NOx absorbent absorbing NOx when an air-fuel ratio of inflowing exhaust gas is lean, and reducing and purifying the absorbed NOx when the air-fuel ratio of the inflowing exhaust gas becomes richer;
   an exhaust gas flow rate control portion for controlling a flow rate of the exhaust gas flowing to the NOx absorbent;
   a reductant addition portion for adding reductant into the exhaust gas passage upstream of the NOx absorbent;
   a temperature rise control portion for controlling a temperature of the NOx absorbent such that the temperature is higher than a predetermined temperature;
   a rich condition control portion for controlling the air-fuel ratio of the exhaust gas flowing to the NOx absorbent such that one of a substantially stoichiometric condition and a rich condition is formed;
   a sulfur poisoning regeneration control portion for discharging sulfur components from the NOx absorbing portion, by executing control of the temperature rise control portion and the rich condition control portion in succession, and furthermore, executing control of the exhaust gas flow rate control portion such that the flow rate of the exhaust gas flowing to the NOx absorbent is less during execution of control of the rich condition control portion than during execution of control of the temperature rise control portion; and
   a by-pass passage that by-passes the NOx absorbent, wherein:
   the exhaust gas flow rate control portion controls both the flow rate of the exhaust gas flowing to the NOx absorbent, and the flow rate of the exhaust gas which by-passes the NOx absorbent.

2. The exhaust gas purification device according to claim 1 wherein:
   the sulfur poisoning regeneration control portion executes control of the reductant addition portion such that a first reductant addition method during the execution of control of the temperature rise control portion is different to a second reductant addition method during the execution of control of the rich condition control portion.

3. The exhaust gas purification device according to claim 1 wherein:
the exhaust gas passage is formed from a first branch passage and a second branch passage, the second branch passage diverging at a point along the first branch passage and then converging at a separate point at a downstream side of the diverging point of the first branch passage,
the NOx absorbent is disposed between the diverging point and converging point of the first and second branch passages, and
the exhaust gas flow rate control portion controls a flow rate ratio of the exhaust gas flowing in each of the first and second branch passages.

4. The exhaust gas purification device according to claim 1 wherein:
the reductant addition, during execution of control of the temperature rise control portion and the rich condition control portion, respectively, is executed by injection of the reductant a plurality of times, each of these injections being executed such that both an injection continuation duration is longer during execution of control of the rich condition control portion than during execution of control of the temperature rise control portion, and an injection frequency is lower during execution of control of the rich condition control portion than during execution of control of the temperature rise control portion.

5. The exhaust gas purification device according to claim 1 wherein:
the reductant addition, during execution of control of the temperature rise control portion and the rich condition control portion, respectively, is executed by injection of the reductant the plurality of times, each of these injections being executed such that both a reductant injection amount of the injection for each of a unit of time is greater during execution of control of the rich condition control portion than during execution of control of the temperature rise control portion, and the injection frequency is lower during execution of control of the rich condition control portion than during execution of control of the temperature rise control portion.

6. The exhaust gas purification device according to claim 1 wherein:
the reductant addition, during execution of control of the temperature rise control portion and the rich condition control portion, respectively, is executed by injection of the reductant the plurality of times, each of these injections being executed such that both the reductant injection amount of the injection for each of the unit of time is greater during execution of control of the rich condition control portion than during execution of control of the temperature rise control portion, and the injection continuation duration of each of the injections is shorter during execution of control of the rich condition control portion than during execution of control of the temperature rise control portion.

7. The exhaust gas purification device according to claim 1 wherein:
the exhaust gas flow rate control portion controls the flow rate of the exhaust gas flowing to the NOx absorbent and controls reversal of a direction of the exhaust gas flowing to the NOx absorbent.

8. The exhaust gas purification device according to claim 7 wherein:
the exhaust gas flow rate control portion has a passage switching valve for reversing the direction of the exhaust gas flowing to the NOx absorbent.

9. The exhaust gas purification device according to claim 7 wherein:
the sulfur poisoning regeneration control portion executes control of the temperature rise control portion and the rich condition control portion for the NOx absorbent which is subject to a sulfur poisoning regeneration control for discharging the sulfur components from the NOx absorbent.

10. An exhaust gas purification device, comprising:
a NOx absorbent which is disposed in an exhaust gas passage through which exhaust gas discharged from an internal combustion engine passes, this NOx absorbent absorbing NOx when an air-fuel ratio of inflowing exhaust gas is lean, and reducing and purifying the absorbed NOx when the air-fuel ratio of the inflowing exhaust gas becomes richer;
an exhaust gas flow rate control portion for controlling a flow rate of the exhaust gas flowing to the NOx absorbent;
a reductant addition portion for adding reductant into the exhaust gas passage upstream of the NOx absorbent;
a temperature rise control portion for controlling a temperature of the NOx absorbent such that the temperature is higher than a predetermined temperature;
a rich condition control portion for controlling the air-fuel ratio of the exhaust gas flowing to the NOx absorbent such that one of a substantially stoichiometric condition and a rich condition is formed;
a sulfur poisoning regeneration control portion for discharging sulfur components from the NOx absorbing portion, by executing control of the temperature rise control portion and the rich condition control portion in succession, and furthermore, executing control of the reductant addition portion such that a first reductant addition method during execution of control of the temperature rise control portion is different to a second reductant addition method during the execution of control of the rich condition control portion; and
a by-pass passage for by-passing the NOx absorbent, wherein;
the exhaust gas flow rate control portion controls both the flow rate of the exhaust gas flowing to the NOx absorbent and the flow rate of the exhaust gas which by-passes the NOx absorbent.

11. The exhaust gas purification device according to claim 10 wherein:
the sulfur poisoning regeneration control portion executes control of the exhaust gas flow rate control portion such that the flow rate of the exhaust gas flowing to the NOx absorbent is less during execution of control of the rich condition control portion than during execution of control of the temperature rise control portion.

12. The exhaust gas purification device according to claim 10 wherein:
the temperature rise control portion determines a reductant amount to be added in accordance with one of, a difference between the temperature of the NOx absorbent prior to a start of temperature rise and a predetermined temperature, and a difference between the temperature of the NOx absorbent during temperature rise progression and the predetermined temperature, and adds the determined reductant amount into the exhaust gas passage using the reductant addition portion, such that a lean condition of an average air-fuel ratio of the exhaust gas flowing to the NOx absorbent within the exhaust gas passage is maintained, and the temperature of the NOx absorbent rises, at least, to the predetermined temperature.

13. The exhaust gas purification device according to claim 10 wherein:

the rich condition control portion controls the air-fuel ratio by adding the reductant into the exhaust gas passage using the reductant addition portion, such that the air-fuel ratio of the exhaust gas flowing within the exhaust gas passage to the NOx absorbent becomes richer than a stoichiometric air-fuel ratio, and the temperature of the NOx absorbent is kept from reaching a temperature at which deterioration of the NOx absorbent occurs.

14. The exhaust gas purification device according to claim 10 wherein:

the exhaust gas passage is formed from a first branch passage and a second branch passage, the second branch passage diverging at a point along the first branch passage and then converging at a separate point along the first branch passage, the NOx absorbent is disposed between the convergence and divergence points of the first and second branch passages, and the exhaust gas flow rate control portion controls a flow rate ratio of the exhaust gas flowing in each of the first and second branch passages.

15. The exhaust gas purification device according to claim 10 wherein:

the exhaust gas flow rate control portion controls the flow rate of the exhaust gas flowing to the NOx absorbent and controls reversal of a direction of the exhaust gas flowing to the NOx absorbent.

16. The exhaust gas purification device according to claim 15 wherein:

the exhaust gas flow rate control portion has a passage switching valve for reversing the direction of the exhaust gas flowing to the NOx absorbent.

17. The exhaust gas purification device according to claim 15 wherein:

the sulfur poisoning regeneration control portion executes control of the temperature rise control portion and the rich condition control portion for the NOx absorbent which is subject to a sulfur poisoning regeneration control for discharging the sulfur components from the NOx absorbent.

* * * * *